(12) United States Patent  (10) Patent No.: US 7,084,779 B2
Uneyama  (45) Date of Patent: Aug. 1, 2006

(54) POWER TOOL

(75) Inventor: Tsunehito Uneyama, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/938,975

(22) Filed: Sep. 10, 2004

(65) Prior Publication Data
US 2005/0057206 A1 Mar. 17, 2005

(30) Foreign Application Priority Data
Sep. 12, 2003 (JP) ............................. 2003-322022

(51) Int. Cl.
G08B 21/00 (2006.01)
(52) U.S. Cl. .................... 340/680; 340/679; 340/573.1
(58) Field of Classification Search ............. 340/686.1, 340/686.5, 686.6, 573.1, 679, 680
See application file for complete search history.

(56) References Cited

U.S. PATENT DOCUMENTS

| 3,785,230 | A |   | 1/1974 | Lokey |         |
|-----------|---|---|--------|-------|---------|
| 4,532,501 | A | * | 7/1985 | Hoffman | 340/679 |
| 5,047,752 | A | * | 9/1991 | Schorn | 340/680 |
| 5,436,613 | A |   | 7/1995 | Ghosh et al. | |
| 5,490,081 | A | * | 2/1996 | Kuromoto et al. | 700/178 |
| 5,942,975 | A | * | 8/1999 | S.o slashed.rensen | 340/562 |
| 2002/0017175 | A1 | | 2/2002 | Gass et al. | |
| 2002/0017176 | A1 | | 2/2002 | Gass et al. | |
| 2002/0017178 | A1 | | 2/2002 | Gass et al. | |
| 2002/0017179 | A1 | | 2/2002 | Gass et al. | |
| 2002/0017180 | A1 | | 2/2002 | Gass et al. | |
| 2002/0017181 | A1 | | 2/2002 | Gass et al. | |
| 2002/0017182 | A1 | | 2/2002 | Gass et al. | |
| 2002/0017183 | A1 | | 2/2002 | Gass et al. | |
| 2002/0017184 | A1 | | 2/2002 | Gass et al. | |
| 2002/0017336 | A1 | | 2/2002 | Gass et al. | |
| 2002/0020261 | A1 | | 2/2002 | Gass et al. | |
| 2002/0020262 | A1 | | 2/2002 | Gass et al. | |

(Continued)

FOREIGN PATENT DOCUMENTS

EP  1 061 487 A  12/2000
WO  WO 96/37350  11/1996

OTHER PUBLICATIONS

European Search Report; Nov. 11, 2004.
European Search Report; Mar. 10, 2004.
U.S. Appl. No. 10/706,514; Masahiko Sako, Filed Nov. 12, 2003.

Primary Examiner—Julie Bichngoc Lieu
(74) Attorney, Agent, or Firm—Orrick Herrington & Sutcliffe LLP

(57) ABSTRACT

The power tool is equipped with a radar for transmitting radio waves towards an area in a vicinity of a rotating tool and for receiving reflected radio waves reflected from a radio wave reflector existing within the area. From the reflected radio waves received by the radar, a distance between the radio wave reflector and the radar, and a speed of change of that distance are calculated. When the calculated distance and speed fulfill a first criterion, a first brake for applying gentle braking to the rotating tool is activated. When the radio wave reflector further approaches to the rotating tool and the calculated distance and speed fulfill a second criterion, a second brake for applying rapid braking to the rotating tool is activated. Distance in the first criterion and the increase as speed increases, and distance corresponding to a certain speed in the first criterion is longer than distance corresponding to the same speed in the second criterion.

8 Claims, 17 Drawing Sheets

U.S. PATENT DOCUMENTS

| | | |
|---|---|---|
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0059855 A1 | 5/2002 | Gass et al. |
| 2002/0066346 A1 | 6/2002 | Gass et al. |
| 2002/0069734 A1 * | 6/2002 | Gass et al. .................... 83/13 |
| 2004/0226424 A1 * | 11/2004 | O'Banion et al. ............ 83/397 |

* cited by examiner

POWER TOOL

CROSS-REFERENCE TO RELATED APPLICATION

This application claims priority to Japanese Patent Application No. 2003-322022, filed on Sep. 12, 2003, the entire contents of which are hereby incorporated by reference.

BACKGROUND OF THE INVENTION

1. Field of the Invention

The present invention relates to power tools. Specifically, it relates to techniques for preventing, as far as possible, an object other than a work from making contact with a rotating tool.

2. Description of the Related Art

U.S. unexamined patent application No. 17336/2002 sets forth a power tool that performs an emergency stop of the tool's rotation when an operator's hand has made contact with the rotating tool. This power tool utilizes the difference of the electric conductivity between human beings and work (wood). The electric potential of the rotating tool becomes higher when the operator's hand makes contact with the rotating tool than the electric potential of the rotating tool when the work (wood) makes contact with the rotating tool. Using this potential difference, the power tool detects timing when the operator's hand makes contact with the rotating tool. The power tool performs an emergency stop of the tool's rotation when the electric potential of the rotating tool becomes higher than a predetermined level. Alternatively, the rotating tool is caused to rapidly retreat to a safe zone.

SUMMARY OF THE INVENTION

The above-described known power tool halts the rotation of the tool or retreats the rotating tool to a safe zone, only after contact between the operator's hand and the rotating tool has been detected. It is not possible to prevent the operator's hand from making contact with the tool under rotation. Consequently, the tool's rotation must be halted, or the rotating tool must be retreated within an extremely short period. This requires a large-scale braking means or retreating means. This technique is very difficult to apply to small-scale power tools such as portable models. Further, troublesome resetting operations are required to recover the power tool to a normal condition once the emergency stopping system is activated.

It is thus an object of the present invention to provide techniques for detecting an occurrence of a situation that there is a high likelihood of the rotating tool making contact with the object other than the work before the object has made contact with the rotating tool. The situation may be detected by monitoring the distance between the rotating tool and the object, and the speed of the object moving toward the rotating tool.

It is another object of the invention to provide techniques for the power tool to activate appropriate measures when the situation having high likelihood of contact is detected. A typical appropriate measure may be activating a brake for the rotating tool. By activating the brake prior to the contact, it becomes possible to stop the rotation of the tool before the object has made contact with the tool.

It is also another object of the invention to provide techniques for the power tool to continue operation when the situation having high likelihood of contact has ceased. Frequent emergency stopping may be avoided and efficient and comfortable operation of the power tool may be continued.

A power tool of the present teaching comprises a radar for transmitting radio waves towards an area in a vicinity of a rotating tool, and for receiving reflected radio waves reflected from a radio wave reflector existing within the area. The power tool further comprises a means for calculating, from the reflected radio waves received by the radar, a distance between the radio wave reflector and the rotating tool, and a speed of change of the distance. The power tool further comprises a first brake for applying gentle braking to the rotating tool when the calculated distance and speed fulfill a first criterion; and a second brake for applying rapid braking to the rotating tool when the calculated distance and speed fulfill a second criterion.

Distance in the first criterion and the second criterion increases as speed increases. When the moving speed of the object toward the rotating tool is fast, there is a high likelihood of contact even when the distance between the object and the rotating tool is long. On the other hand, when the moving speed of the object is slow, there is a high likelihood of contact only when the distance is short.

The distance corresponding to a certain speed in the first criterion is longer than distance corresponding to the same speed in the second criterion. When the object is moving toward the rotating tool, the first criterion having longer distance is fulfilled first, and the second criterion having shorter distance is fulfilled later.

According to the power tool of the present teaching, when the radio wave reflector, such as an operator's hand, approaches to the rotating tool and the calculated distance becomes shorter than that as defined in the first criterion, then the first brake is activated and gentle braking force is applied to the rotating tool. When the radio wave reflector further approaches to the rotating tool and the distance becomes shorter than that as defined in the second criterion, then the second brake is activated and rapid braking force is applied to the rotating tool. According to the power tool, when the radio wave reflector further approaches to the rotating tool and makes contact with the tool, the rotation of the tool may be already stopped, therefore preventing the object from making contact with the tool under rotation.

The distance when the first brake is activated is longer when the speed of the object is faster. Similarly, the distance when the second brake is activated is longer when the speed of the object is faster. The distance corresponding to a certain speed of the object in the first criterion is longer than distance corresponding to the same speed in the second criterion. The first criterion is fulfilled at a longer distance than the distance at which the second criterion is fulfilled. The first brake is activated prior to the activation of the second brake. It may be possible that the object approaches to the rotating tool until the first criterion is fulfilled, however the object retreats from the rotating tool before the second criterion is fulfilled. In this case, the rapid braking is not activated and the operator may continue the operation of the power tool without being interrupted.

It is known that radio wave reflection coefficients vary according to type of material. Work (wood) has a low moisture content and has a lower radio wave reflection coefficient than objects other than work such as operator's hand. Work (wood) does not constitute an effective radio wave reflector, whereas objects other than work do constitute effective radio wave reflectors.

As a result, if a radar is provided that transmits radio waves towards the area in the vicinity of the rotating tool and receives reflected radio waves, a radio wave reflector existing within the area can be detected, and the presence of work does not interfere with the detection. The power tool may detect a radio wave reflector in the area hidden by the work.

Using the radar, the distance from the radar to the radio wave reflector can be detected. It is thus possible to detect the distance between the radio wave reflector and the rotating tool. By detecting the distance at particular points in time, it is possible to detect the speed at which this distance changes. That is, it is possible to detect the speed of movement at which the radio wave reflector is moving towards the rotating tool. The speed of movement at which the radio wave reflector is moving towards the rotating tool may also be detected directly by using a radar that detects the Doppler effect.

The likelihood that the radio wave reflector will make contact with the rotating tool may be calculated from the distance thereof from the rotating tool together with its speed of movement towards the rotating tool. If there is rapid movement towards the rotating tool, there is a high likelihood of the radio wave reflector making contact with the rotating tool even if the radio wave reflector is a long distance away. If there is no rapid movement towards the rotating tool, there is a low likelihood of the radio wave reflector making contact with the rotating tool (as long as the radio wave reflector is not a short distance from the rotating tool).

In the present teachings, criteria which are based on the combination of distance and speed are utilized to detect an occurrence of a situation having high likelihood of contact between the radio wave reflector and the rotating tool. The power tool may start necessary measures at the time when the occurrences are detected.

In order to brake a power tool wherein a tool is rotating, braking that counteracts inertial energy must be applied.

When a power tool that has a high degree of inertial energy is braked rapidly, an extremely high load is exerted upon the brake, and an extremely strong counter force is exerted on the power tool and on a support that is supporting the power tool. A brake and support capable of withstanding this load can be realized, but are impractical.

In the present teachings, gentle braking force is applied in a case where the tool is rotating at high speed and has a high degree of inertial energy. As long as braking is gentle, no particularly heavy load is exerted on the brake, and no particularly strong counter force is exerted on the power tool and on the support that is supporting the power tool. It is comparatively easy to provide a brake and a support capable of withstanding this load and counter force.

Halting the tool by means of gentle braking requires too much time. To deal with this, a power tool of the present teachings first applies gentle braking and thereby reduces inertial energy, and then applies rapid braking. Rapid braking, when applied after inertial energy has been reduced, exerts no particularly heavy load on the brake, and no particularly strong counter force is exerted on the power tool and on the support that is supporting the power tool. It is comparatively easy to provide a brake and a support capable of withstanding this load and counter force.

A power tool of he present teachings may utilize a combination of a first brake for applying gentle braking and a second brake for applying rapid braking. Each brake may be activated based upon each criterion. Each criterion may be defined by the combination of distance and speed. Braking systems are activated in a sequence of the first brake and the second brake when there is a high likelihood that the radio wave reflector will make contact with the rotating tool.

The following are the possible situations in the power tool of the present teachings:

(1) The combination of distance and speed does not fulfill the first criterion. In this situation, neither the first brake nor the second brake operates. Operations utilizing the power tool can continue.

(2) The combination of distance and speed fulfills the first criterion and does not fulfill the second criterion. Here, the set distance is long in the first criterion and short in the second criterion relative to identical speed. Consequently, when the radio wave reflector approaches to the rotating tool, this state is detected at an early stage. The first brake operates when this state has been detected, thereby applying gentle braking. Since this braking is gentle, no particularly heavy load is exerted on the brake, and no particularly strong counter force is exerted on the power tool and on the support that is supporting the power tool.

(3) The combination of distance and speed fulfills the first criterion and then fulfills the second criterion. When the radio wave reflector comes closer to the tool, this state is detected. The second brake operates when this state has been detected, thereby applying rapid braking. The rotation of the tool is halted rapidly. Since the tool's rotation is halted before the radio wave reflector makes contact therewith, the radio wave reflector such as an operator's hand does not make contact with the tool under rotation. Although braking is rapid, speed has already been reduced by the first brake. Consequently, no particularly heavy load is exerted on the second brake, and no particularly strong counter force is exerted on the power tool and on the support that is supporting the power tool.

(4) The combination of distance and speed fulfilled the first criterion but escapes from the first criterion without fulfilling the second criterion. This situation occurs where the radio wave reflector temporarily approached the rotating tool and then retreats. The braking of the first brake is released and operations using the power tool can be continued.

A power tool of the present teachings has been developed based on a technique for detecting occurrence of the situation that there is high likelihood of the radio wave reflector making contact with the rotating tool before the radio wave reflector has made contact with the rotating tool.

It is preferred that a one-way clutch is inserted between the rotating tool and a motor for causing the tool to rotate, this one-way clutch causing the rotating tool and the motor to be in a disengaged state in a case where the rotation speed at the motor side is slower than the rotation speed at the rotating tool side. In this case, it is preferred that the first brake applies braking force to a component at the motor side of the one-way clutch, and that the second brake applies braking force to a component at the rotating tool side of the one-way clutch.

The inertia energy of the motor is greater than that of the rotating tool. With this power tool, when the first criterion is fulfilled while the motor is causing the tool to rotate, the first brake applies braking force to the motor side component. Although the motor side component receives braking force and the rotation speed at the motor side is reduced, the one-way clutch allows the tool to continue rotation at high speed. Meanwhile, the rotation speed at the motor side continues to fall.

If the radio wave reflector comes closer to the rotating tool, thereby fulfilling the second criterion, the second brake operates to apply rapid braking force to the rotating tool. At this point, the rotation speed at the motor side has already been reduced and the one-way clutch is rotating idly. Consequently, the second brake needs to brake only the components at the rotating tool side. These have a small inertia energy, and consequently rapid braking is possible. There is a possibility that the rotation speed at the motor side will catch up while the components at the rotating tool side are being braked rapidly. In that case, the motor is also rapidly braked by the second brake. However, at this juncture, the motor has already slowed down and inertia energy thereof has decreased, so that the rapid braking of the motor does not create any problem.

In a case where the motor causing the tool to rotate is an electric motor, it is preferred that the first brake is realized as a regenerative brake that brakes the electric motor by causing the electric motor to generate electric power. The configuration of the device can thus be simpler than in the case where a mechanical brake is adopted.

A clutch may be inserted between the rotating tool and a motor for causing the tool to rotate, the clutch being capable of switching the rotating tool and the motor between an engaged state and a disengaged state. In this case, it is preferred that the first brake, by switching the clutch to the disengaged state, causes a state wherein a braking force is applied to the rotating tool by means of friction generated between the rotating tool and work, and the second brake applies braking force to a component at the rotating tool side of the clutch.

In power tools, strong friction is generated between the rotating tool and the work while the work is being processed. The present power tool effectively utilizes this friction. When a state occurs where the first criterion is fulfilled, the first brake switches the clutch to the disengaged state. This separates the motor, which has large inertia energy, from the rotating tool. Since the rotating tool has small inertia energy, the rotating tool is effectively braked by the friction between the rotating tool and the work, and a large counter force is not exerted on the work.

If the radio wave reflector approaches sufficiently to fulfill the second criterion, the second brake applies braking force to the rotating tool. At this point, the clutch has been disengaged and, since the tool is rotating without being connected to the motor, the second brake can rapidly brake the rotation of the tool.

In another aspect of the present teachings, a power tool may comprise a motor for causing the tool to rotate, a clutch inserted between the rotating tool and the motor, the clutch being capable of switching the rotating tool and the motor between an engaged state and a disengaged state, a radar for transmitting radio waves towards an area in a vicinity of the rotating tool and for receiving reflected radio waves reflected from a radio wave reflector present within the area, a means for calculating, from the reflected radio waves received by the radar, the distance between the radio wave reflector and the rotating tool and a speed of change of the distance, means for switching the clutch to the disengaged state when the calculated distance and speed fulfill a first criterion, and a tool brake for applying braking force to the rotating tool when the calculated distance and speed fulfill a second criterion.

Distance in the first criterion and the second criterion increases as speed increases, and distance corresponding to a certain speed in the first criterion is longer than distance corresponding to the same speed in the second criterion.

The term 'motor' is not restricted to electric motors, but also encompasses motors that rotate by means of compressed air, motors that rotate by means of ultrasonic waves, motors that rotate by engines, etc.

The power tool described above also uses the first criterion to detect the likelihood that the radio wave reflector will make contact with the rotating tool. In the power tool described above, the clutch is caused to be in a disengaged state at this period. The tool and the motor are thereby caused to be in an independent state wherein they rotate freely, and it is then observed whether the second criterion has been fulfilled. If the first criterion is no longer fulfilled and the second criterion has not been fulfilled, the clutch reassumes the engaged state and operations can continue. If the radio wave reflector approaches sufficiently for the second criterion to be fulfilled, the tool brake applies braking force to the rotating tool. At this point, the clutch had been disengaged. Since the rotating tool, which has small inertia energy, is rotating without being connected to the motor, the tool brake can rapidly brake the rotation of the tool.

The rotation of the tool is rapidly halted in this power tool. This consequently reduces the risk that the radio wave reflector such as a hand of an operator will make contact with the tool under rotation. Although braking is rapid, the tool and the motor have already been disengaged by the clutch. Consequently no particularly heavy load is exerted on the tool brake, and no particularly strong counter force is exerted on the power tool and on the support that is supporting the power tool. The configuration of the brake is simplified, and the durability thereof is improved.

The aforementioned clutch can be, for example, an electromagnetic powder clutch, a pneumatic clutch, etc. Furthermore, a centrifugal clutch can also be utilized in combination with a brake for braking the motor side componets. When the motor is rotating at a determined number of rotations, the centrifugal clutch causes the motor and the tool to be in an engaged state. When the motor is rotating below the determined number of rotations, the centrifugal clutch causes the motor and the tool to be in a disengaged state. The transmission of power between the motor and the tool can thus be cut off by braking the motor side componets. In the case where this centrifugal clutch is utilized, the motor does not need to be halted, but needs to be braked only to the extent that the centrifugal clutch achieves the disengaged state.

In the power tools of the present teachings, it is preferred that radio waves are utilized that readily penetrate wooden material and are readily reflected from objects made of metal and from objects having a high moisture content. These characteristics can be obtained by utilizing radio waves having a frequency of 1 G to 30 GHz. It is thus possible to prevent, as far as possible, the occurrence of phenomena such as the radar wrongly identifying work and thus causing unnecessary emergency braking. It is also possible to prevent the radar from failing to detect the radio wave reflector that is hidden in the shadow of work. Emergency braking is activated when necessary.

In the present specification, the braking of the rotating tool is not restricted to braking wherein braking force is applied directly to the rotating tool. Braking of the rotation may be any actions that result in the braking of the rotation of the tool. For example, the rotating tool is also braked by applying braking force to components joined with the rotating tool, such as a tool shaft.

The present teaching is developed based on a power tool that is being used normally as a reference, and emergency barking operation has a certain limitation. The operation and effects of the present teachings must not be expected to counteract actions wherein an object other than a work is intentionally brought towards an operating tool.

The present teachings allow a power tool for preventing, as far as possible, a radio wave reflector other than a work from making contact with a rotating tool. In particular, it is possible to detect a state wherein it is likely that the radio wave reflector other than the work will make contact with the rotating tool before actual contact occurs. The operation of the rotating tool can be braked in response to this state. Consequently, there is a high likelihood that the rotation of the tool can be halted before the object other than the work makes contact with the tool.

PREFERRED FEATURES TO PRACTICE THE INVENTION

Preferred features to practice the present invention are described below.
(FEATURE 1) The table saw is designed for cutting work that consists of wood.
(FEATURE 2) The table saw has a regenerative braking circuit that utilizes the rotation of an electric motor to cause electric power to be generated. This electric power generation causes the electric motor to be braked.
(FEATURE 3) The table saw has a saw shaft brake that obtains braking force by causing a wedge-shaped component to make contact with the saw shaft. This rapidly halts the saw shaft and circular saw, etc.
(FEATURE 4) In the table saw, the regenerative braking of the electric motor is activated first, and the saw shaft brake is activated thereafter.
(FEATURE 5) The table saw stores a conditions map, which is a two-dimensional map of distance and speed. The distance in the map means the distances between a radio wave reflector and the circular saw, and the speed in the map means a speed at which the radio wave reflector approaches to the circular saw. The map shows criteria for activating the regenerative brake of the electric motor and the saw shaft brake, respectively.

PREFFERED EMBODYMENTS TO PRACTICE THE INVENTION (Embodiment 1)

Figure 1:
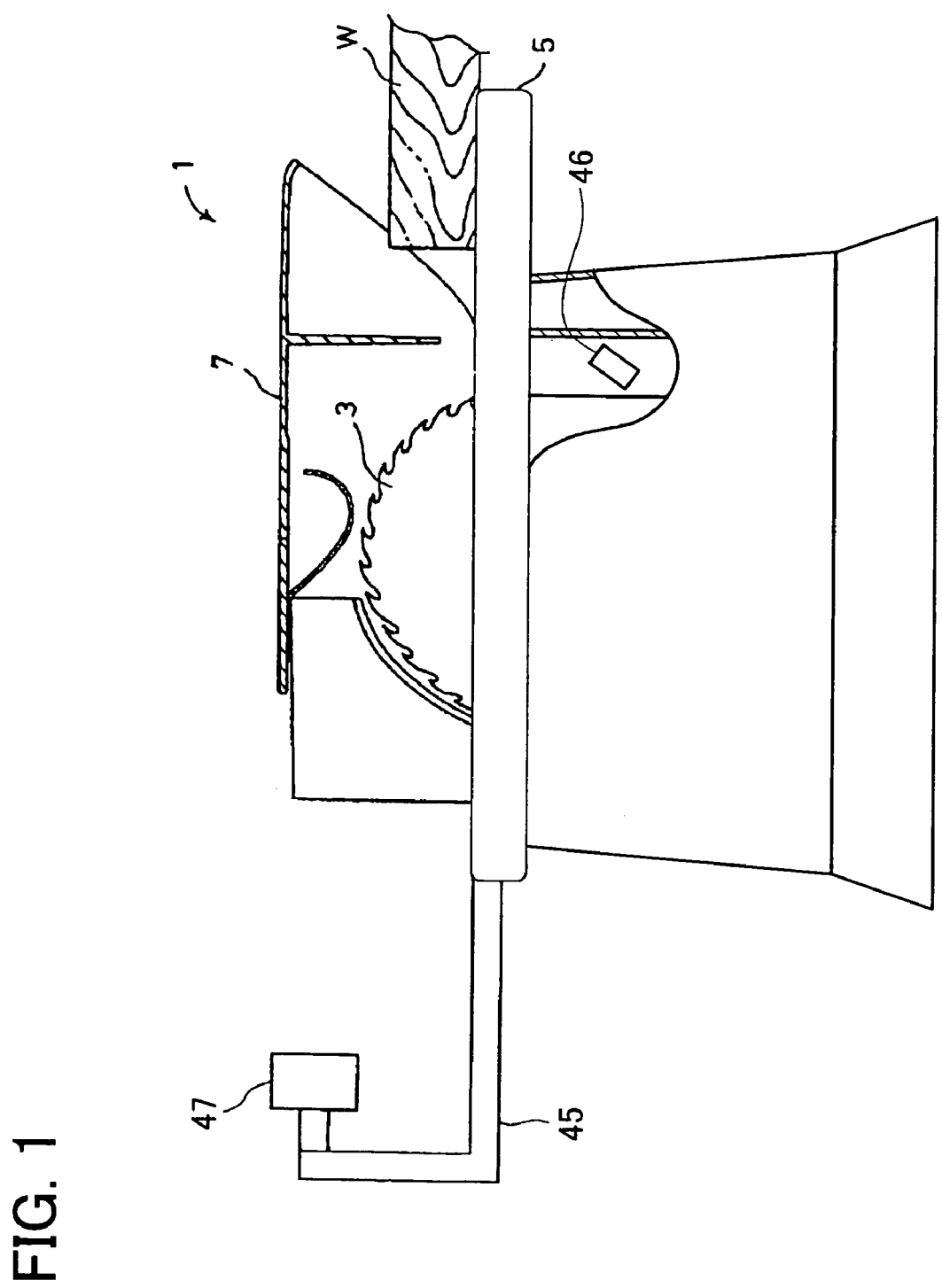
FIG. 1 shows a side view of a table saw of a first embodiment.
Figure 2:
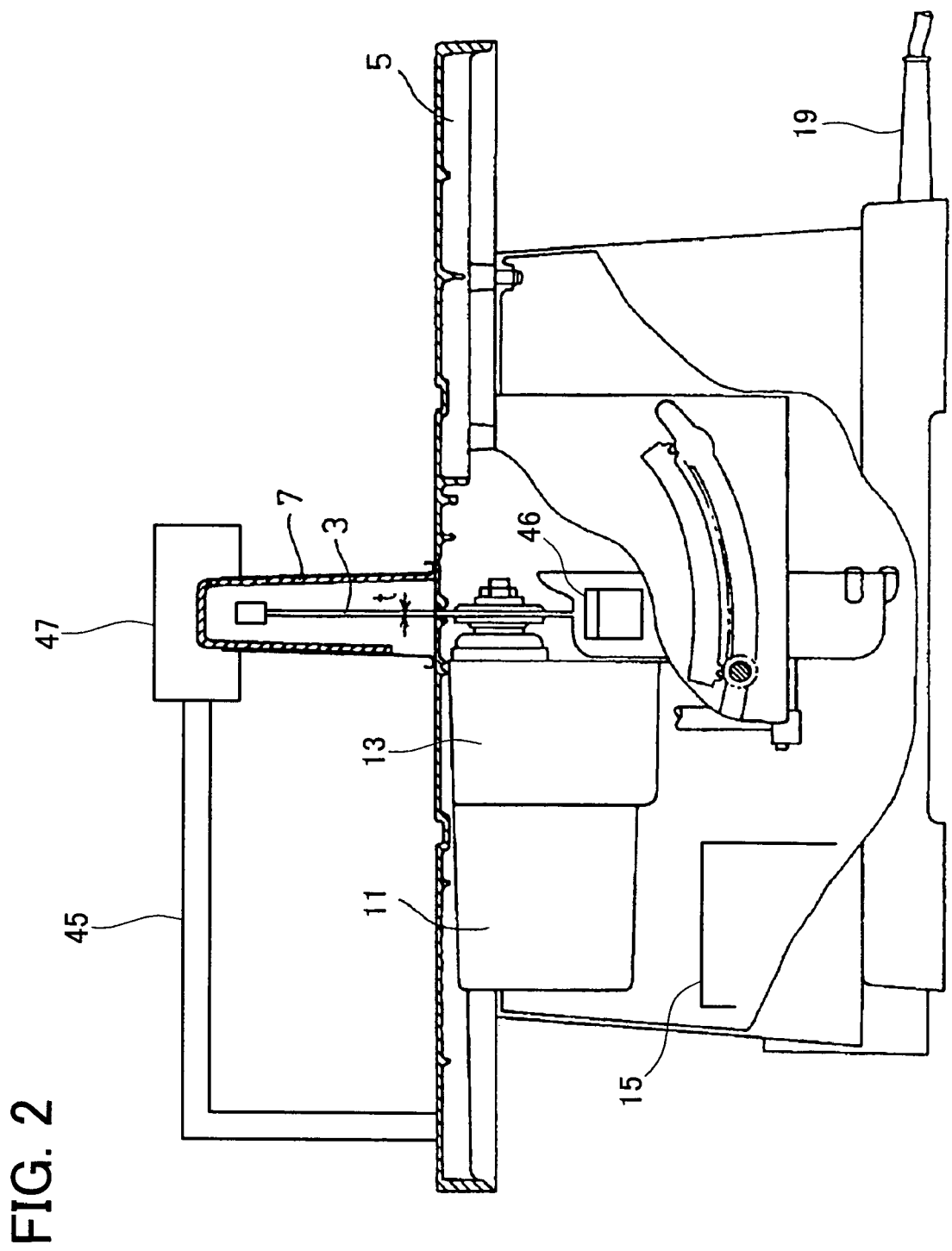
FIG. 2 shows a front view of the table saw of the first embodiment.

The table saw 1 illustrated in FIGS. 1 and 2 is developed in accordance with the present teaching. The table saw 1 is a power tool designed for cutting wooden work W. As shown in FIG. 1, the table saw 1 is provided with a table 5 on which the work W is placed, a circular saw 3 having a portion thereof protruding above the table 5, and a safety cover 7 that covers the protruding portion of the circular saw 3. The safety cover 7 is rotatably attached above the table 5 and is pushed open by the work W during cutting.

As shown in FIG. 2, the table saw 1 is provided with a motor 11 for driving the circular saw 3, a power transmission member 13 for transmitting power from the motor 11 to the circular saw 3, and a controlling member 15 for controlling the operation of the table saw 1. Electricity is supplied to the table saw 1 from a power supply cord 19.

Figure 3:
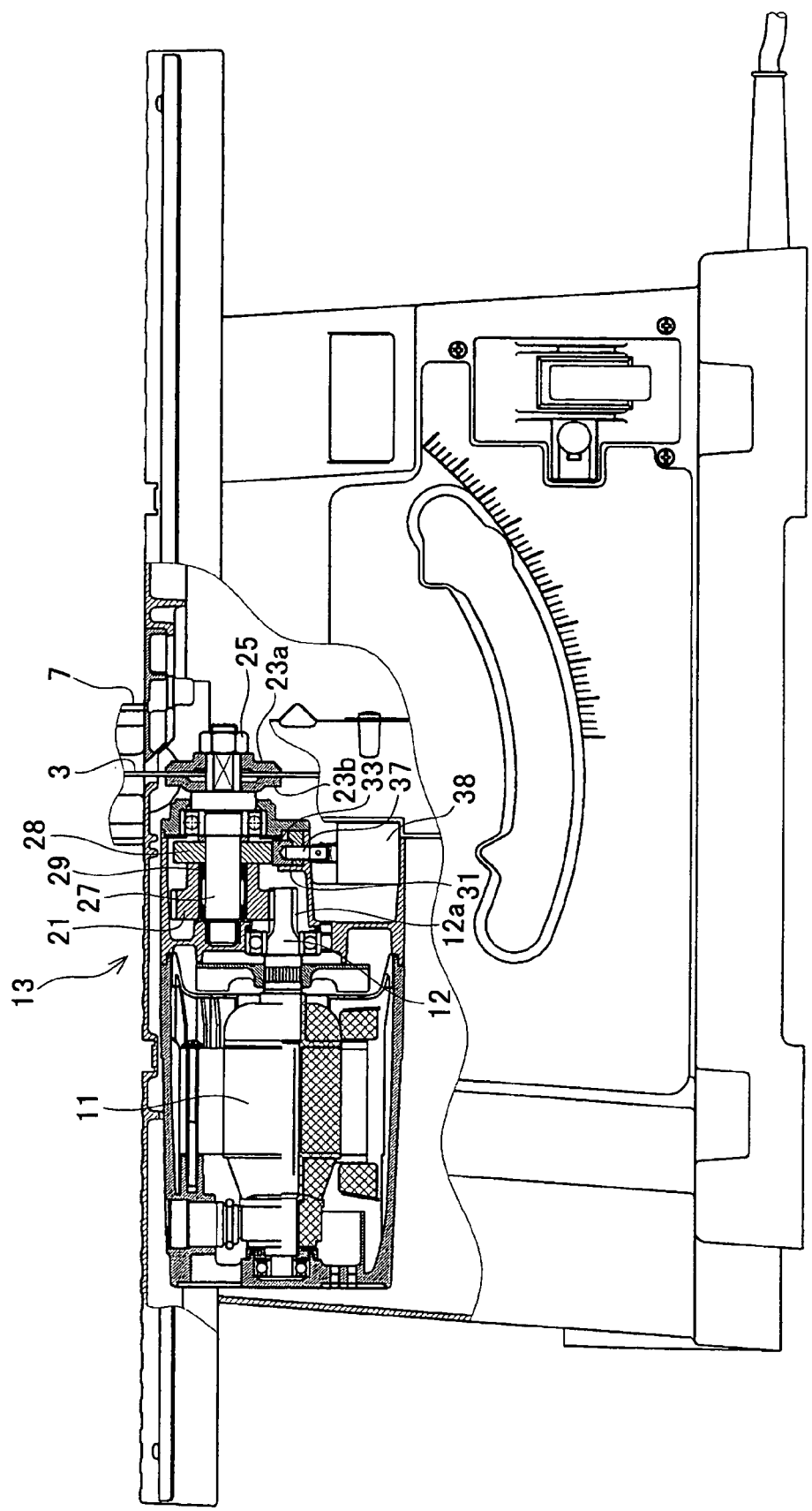
FIG. 3 shows a cross-sectional view showing a power transmitting configuration of the table saw.

FIG. 3 is a partial cross-sectional view of the table saw 1 showing the configuration for transmitting the power from the motor 11 to the circular saw 3 via the power transmission member 13. A gear 12a is formed around a rotating shaft 12 of the motor 11. The power transmission member 13 is provided with a gear 21 that engages with the gear 12a of the rotating shaft 12, a saw shaft 27 that is rotatably supported on the same axis as the gear 21, and a one-way clutch 29 inserted between an inner hole face of the gear 21 and an outer circumference face of the saw shaft 27. The circular saw 3 is fixed to the saw shaft 27, by means of attaching plates 23a and 23b and an attaching bolt 25, etc., at a positioning extending from the power transmission member 13.

The one-way clutch 29 is a clutch that, when the circular saw 3 is rotating in the normal direction of rotation, separates the gear 21 and the saw shaft 27 when the rotation speed of the gear 21 is slower than the rotation speed of the saw shaft 27. Consequently, the rotation speed of the saw shaft 27 is usually greater than or equal to the rotation speed of the gear 21, and the saw shaft 27 rotates idly when the rotation speed of the saw shaft 27 is greater than the rotation speed of the gear 21.

The one-way clutch 29 can be a clutch wherein sprags, for example, balls, rollers, etc. engage in only one direction between a driving side and a driven side, a clutch using ratchets, a clutch using a cam, a clutch using the stored force of a coiled spring wound within a shaft, etc. The clutch can be chosen to meet requirements, and is not restricted to a particular type.

The rotational power of the rotating shaft 12 is transmitted to the gear 21 when the motor 11 rotates. When the gear 21 begins to rotate, the one-way clutch 29 is selected to the engaged state, and the saw shaft 27 is rotated. This transmits the rotational power of the motor 11 to the saw shaft 27. The circular saw 3 rotates together with the saw shaft 27, and a user (operator) of the table saw 1 is able to perform cutting operations of the work W. If, for example, the driving operation of the motor 11 is halted while it is driving the circular saw 3, the rotation speed of the rotating shaft 12 decreases. Thereupon the rotation speed of the saw shaft 27 becomes greater than the rotation speed of the gear 21, and the saw shaft 27 begins to rotate idly.

As shown in FIG. 3, an expanded diameter member 28 is formed on the saw shaft 27. The expanded diameter member 28 and the saw shaft 27 may be molded integrally, or may be molded as separate components and fixed together. The expanded diameter member 28 and the saw shaft 27 should not rotate relative to one another.

A saw shaft brake 31 is provided at a peripheral position of the expanded diameter member 28 of the saw shaft 27. The saw shaft brake 31 is formed mainly from a sliding block 33, a locking pin 37, and a solenoid 38, etc.

Figure 4:
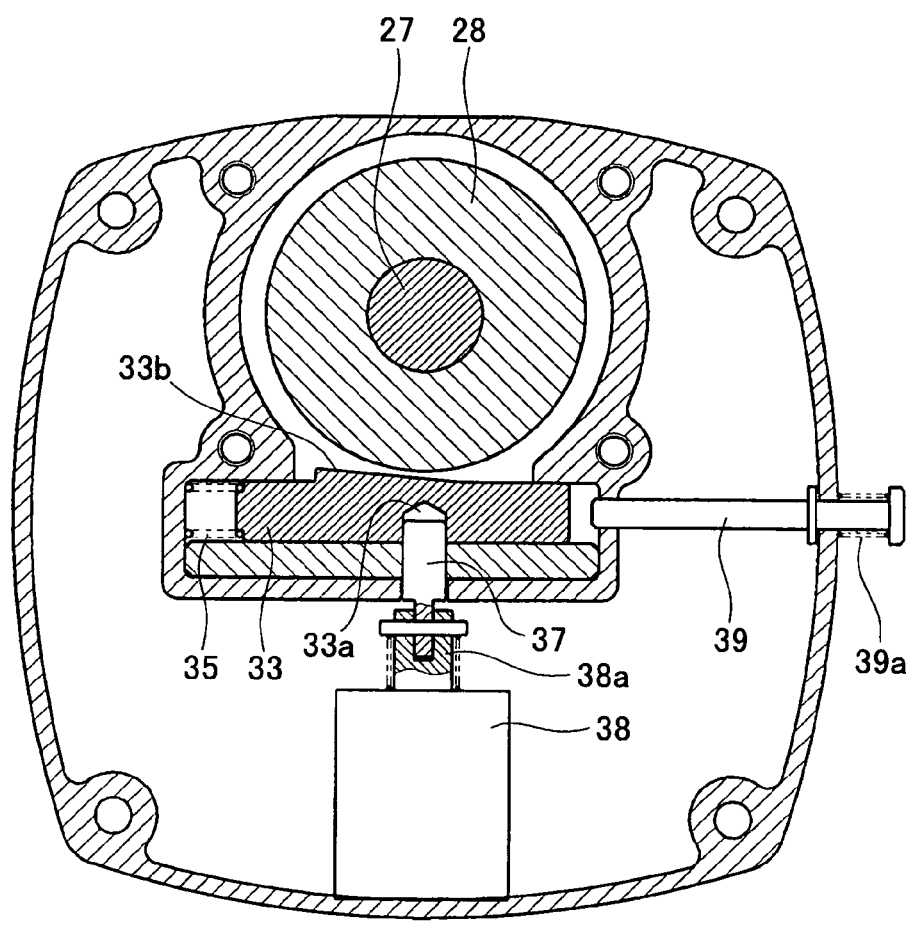
FIG. 4 shows a state wherein a saw shaft brake is not operating.

As shown in FIG. 4, the saw shaft brake 31 consists of the sliding block 33 that is slid during operation to make contact with the expanded diameter member 28 of the saw shaft 27, a spring 35 for causing the sliding block 33 to slide, the locking pin 37 for restraining the sliding block 33 in a waiting position, the solenoid 38 that withdraws the locking pin 37 from the sliding block 33, etc. Further, the saw shaft brake 31 is provided with a pushing rod 39 that pushes the sliding block 33 back to the waiting position, and a spring 39a that energizes the pushing rod 39 to the waiting position. A face 33b of the sliding block 33 is formed in an inclined wedge shape. This face 33b makes contact with the expanded diameter member 28.

FIG. 4 shows a state wherein the saw shaft brake 31 is not operating. The sliding block 33 is in the waiting position wherein it does not make contact with the expanded diameter member 28 of the saw shaft 27. In this state, the spring 35 is thoroughly compressed, and the resilient force of the spring 35 is operating upon the sliding block 33. This resilient force is a force capable of sliding the sliding block 33 to a position wherein it makes contact with the expanded diameter member 28. The locking pin 37 engages with a hole 33a provided in the sliding block 33, thereby restraining the sliding block 33 in the waiting position. The locking pin 37 is connected with a needle 38a of the solenoid 38. The solenoid 38 keeps the needle 38a protruding when power is not passing therethrough.

Figure 5:
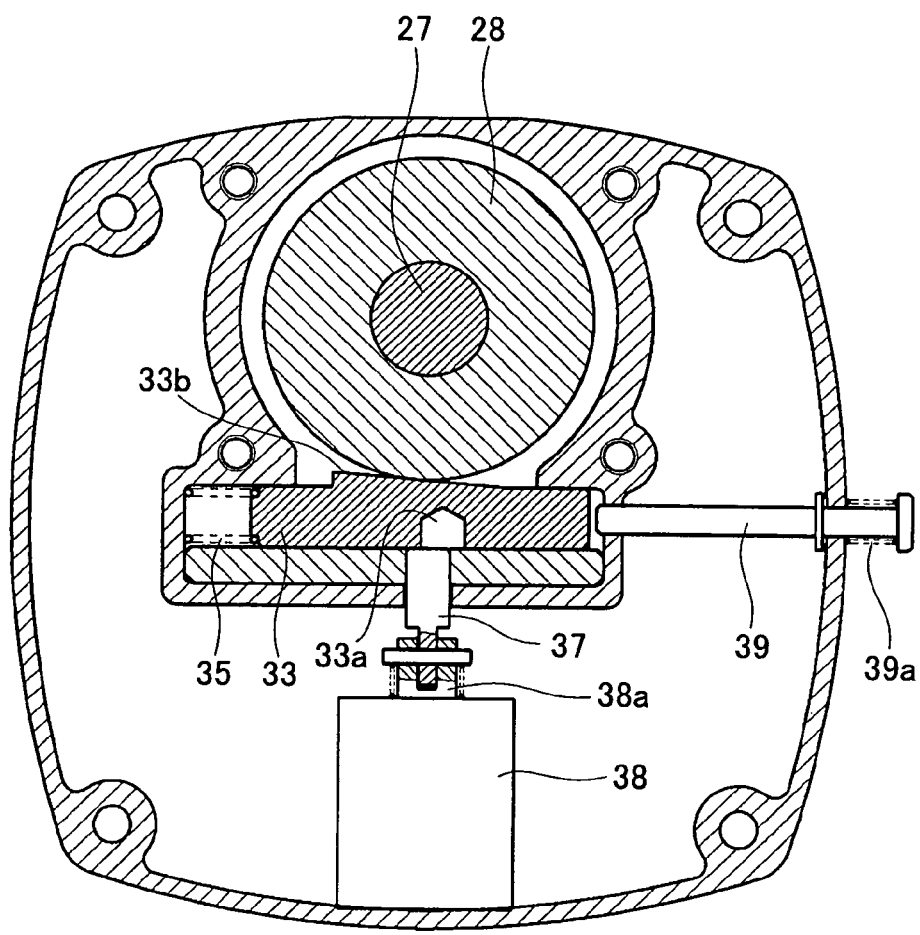
FIG. 5 shows a state wherein the saw shaft brake is operating.

FIG. 5 shows the saw shaft brake 31 in an operating state. Operating the solenoid 38 causes the saw shaft brake 31 to start operation. When power passes through the solenoid 38, the protruding needle 38a is rapidly withdrawn. As a result, the locking pin 37 that is connected with the needle 38a is withdrawn from the hole 33a of the sliding block 33. The sliding block 33 is thereby released from its restraint by the locking pin 37, and is slid by the resilient force of the spring 35 towards a position whereby it makes contact with the expanded diameter member 28. When the sliding block 33 and the expanded diameter member 28 make contact, the friction between the sliding block 33 and the expanded diameter member 28 brakes the saw shaft 27. At this juncture, the sliding block 33 is pulled further inwards by the friction with the expanded diameter member 28, and the frictional force between the sliding block 33 and the expanded diameter member 28 increases, thereby more strongly braking the saw shaft 27. That is, the rotating circular saw 3 is rapidly halted.

Halting the flow of the power through the solenoid 38 and pushing in the pushing rod 39 returns the saw shaft brake 31 to its original state after operation. The pushing rod 39 pushes the sliding block 33 back to the waiting position. When the sliding block 33 is moved to the waiting position, the needle 38a of the solenoid 38 engages with the hole 33a.

The saw shaft 27 may be caused to rotate in the reverse direction when the sliding block 33 strongly makes contact with the expanded diameter member 28. By this means, the saw shaft brake 31 can easily be returned to its original state after operation.

Figure 6:
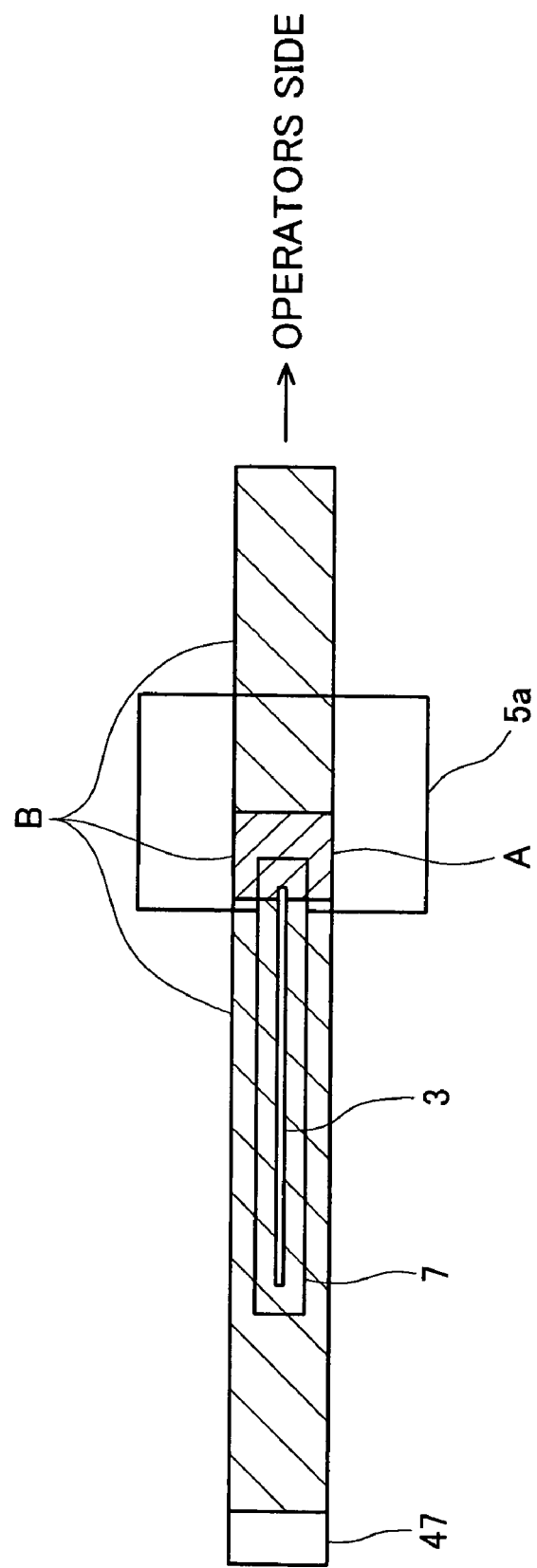
FIG. 6 shows an area monitored by radar.

As shown in FIG. 1, a first radar 46 and a second radar 47 are located at the anterior and posterior respectively of the circular saw 3. The first radar 46 monitors a first prescribed area A that is in the vicinity of a location where a blade edge of the circular saw 3 and the work W make contact (a processing location). The first prescribed area A is shown in FIG. 6 (the hatched area at the lower right). FIG. 6 is a schematic view, viewed from above, of the vicinity of the circular saw 3 of the table saw 1. As shown in FIGS. 1 and 2, the first radar 46 is located to the anterior of the circular saw 3 below the table 5. Since the first radar 46 is provided below the table 5, a penetrable window 5a through which radio waves penetrate is provided in the table 5 near the anterior edge of the circular saw 3 (see FIG. 6). The penetrable window 5a can be formed from a resin plate.

The second radar 47 is a radar for monitoring a second prescribed area B that extends along the circular saw 3 in the direction in which work is sent. The second prescribed area B is shown in FIG. 6. The first prescribed area A is encompassed within the second prescribed area B. As shown in FIGS. 1 and 2, the second radar 47 is attached to the tip of an arm 45 provided at the posterior of the table 5. As is clear from the figure, the second radar 47 is located above and to the posterior of the circular saw 3 (the side opposite the operator). Moreover, the second radar 47 is located such that the center thereof is above the surface of the circular saw 3. This minimizes the area of shadow of the circular saw 3 that the second radar 47 is confronted with.

Next, the first radar 46 and the second radar 47 will be described in more detail. First, the first radar 46 will be described.

Figure 7:
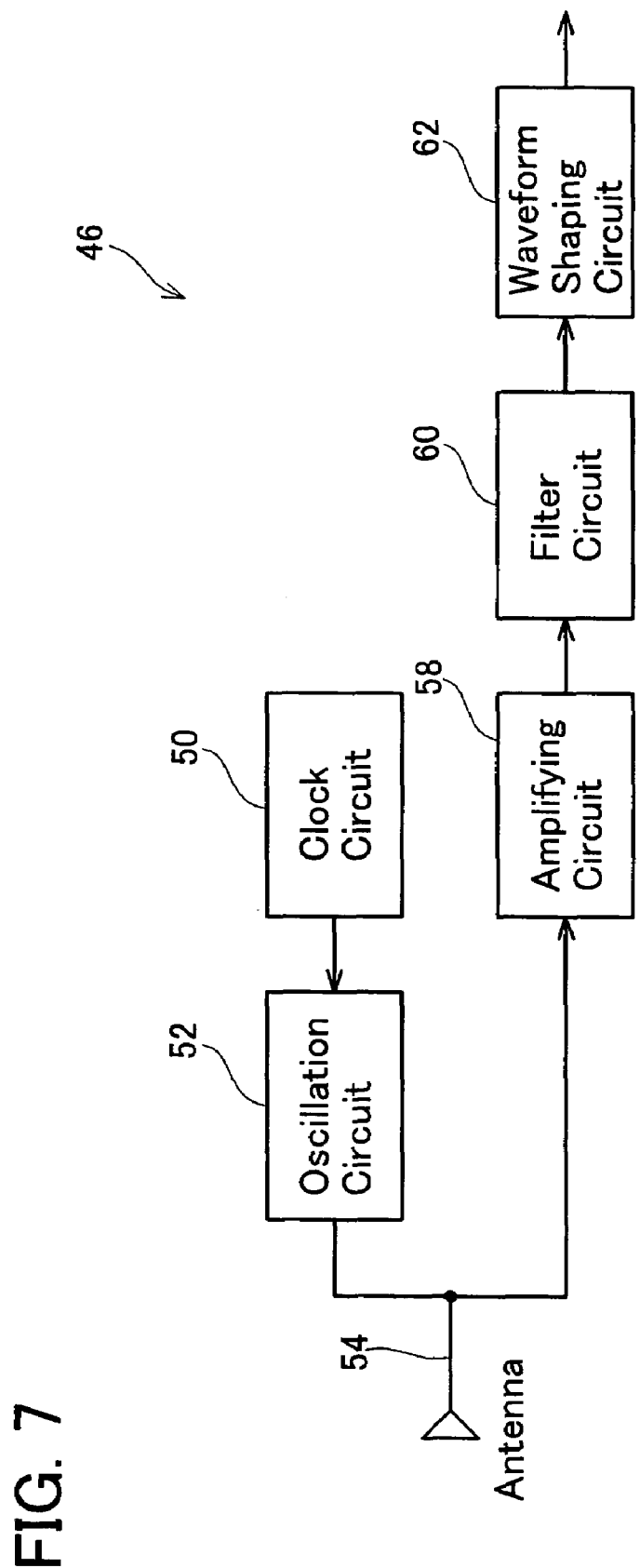
FIG. 7 shows a block diagram showing a configuration of a first radar.

As shown in FIG. 7, the first radar 46 is provided with a transmitting and receiving antenna 54 for transmitting and receiving radio waves. An oscillation circuit 52 for outputting an electrical signal oscillated at a specified frequency is connected with the transmitting and receiving antenna 54 (specifically, with a radio wave transmitting member of the transmitting and receiving antenna 54). A clock circuit 50 is connected with the oscillation circuit 52. The clock circuit 50 is a circuit for periodically causing the output of the oscillation circuit 52 to be ON or OFF. Radio waves are transmitted from the transmitting and receiving antenna 54 only while an output gate signal is being input from the clock circuit 50 to the oscillation circuit 52.

Further, a waveform shaping circuit 62 is connected with the transmitting and receiving antenna 54 (specifically, with a radio wave receiving member of the transmitting and receiving antenna 54) via an amplifying circuit 58 and a filter circuit 60. The amplifying circuit 58 amplifies the signal of the radio waves received by the transmitting and receiving antenna 54. The filter circuit 60 removes noise from the signal amplified by the amplifying circuit 58. The waveform shaping circuit 62 shapes the waveform of the signal that was output from the filter circuit 60, then outputs the shaped signal to the controlling member 15.

The radio waves output from the first radar 46 may have a frequency of 1 to 30 GHz. In the present embodiment, 10.5 GHz microwaves are used. The radio wave reflection coefficient of the work W (wood) and the radio wave reflection coefficient of an object other than work W (such as a hand of the operator, a metal object, etc.) differ greatly with the radio waves of this frequency band. This difference in radio wave reflection coefficients can be utilized to enable discrimination between the work W and objects other than the work W. Specifically, with radio waves of this frequency band, wood—which has a low moisture content—has a low radio wave reflection coefficient and a high penetration coefficient. Conversely, objects having a high moisture content (a hand of the operator, etc.) and metal have a high radio wave reflection coefficient. As a result, it is possible to use the strength of the peak values of the reflected radio waves to determine whether the reflected waves have been reflected from the work W or from the object other than work W. Furthermore, it is also possible to irradiate the object other than work W that is hidden in the shadow of the work W with the radio waves and to receive the reflected waves thereof. That is, the work W is not a reflector from which radio waves of the above mentioned frequency band are reflected, whereas objects other than the work W, such as a hand of the operator, metal, etc., are reflectors.

Figure 8:
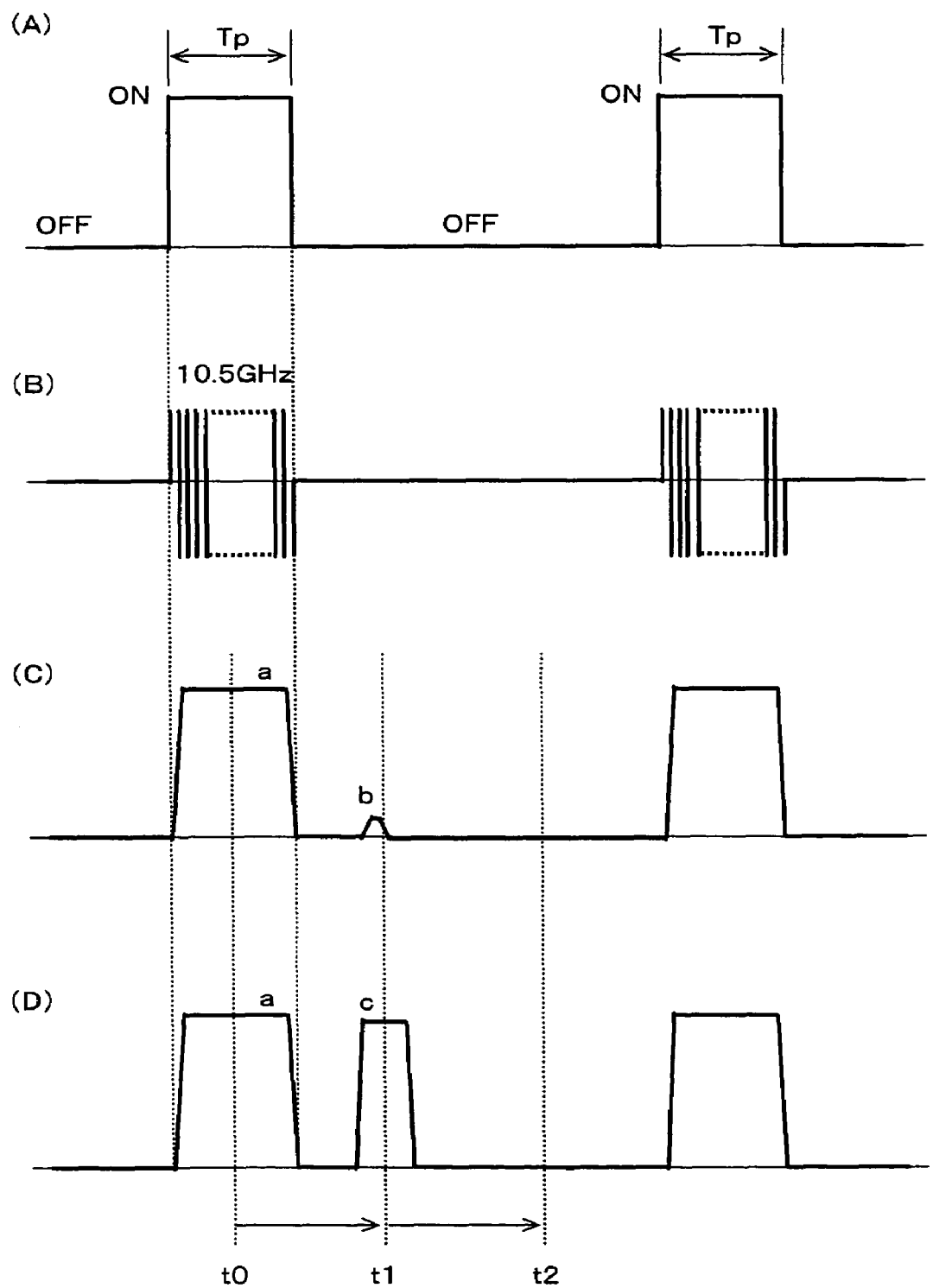
FIG. 8(A) to (D) show waveforms of radio waves transmitted from the first radar and waveforms of radio waves received by the first radar.

FIG. 8 shows radio waves transmitted from the first radar 46 together with output waveforms of radio waves received by the first radar 46. FIG. 8(A) shows the output gate signal that is input to the oscillation circuit 52 from the clock circuit 50. This shows the period when a high frequency voltage is input to the transmitting and receiving antenna 54 from the oscillation circuit 52. FIG. 8(B) shows the waveform of the high frequency voltage being input from the oscillation circuit 52 to the transmitting and receiving antenna 54. FIG. 8(C) shows the output waveform of a radio wave that is output by the first radar 46 when only work W (wood) is located in the first prescribed area A. FIG. 8(D) shows the output waveform of a radio wave that is output by the first radar 46 when work W and a radio wave reflector (for example, a finger of the operator, etc.) are located in the first prescribed area A.

As shown in FIG. 8(A), the output gate signal is input to the oscillation circuit 52 only during periodic time intervals Tp. As a result, as shown in FIG. 8(B), a voltage of 10.5 GHz is output from the oscillation circuit 52 only during the time intervals Tp. This output voltage is transmitted as radio waves from the transmitting and receiving antenna 54.

After the radio waves have been transmitted from the radio wave transmitting member of the transmitting and receiving antenna 54, the transmitted radio waves and the reflected radio waves thereof are received by the radio wave receiving member of the transmitting and receiving antenna 54. In FIGS. 8(C) and 8(D), peaks 'a' show received waveforms that were transmitted from the radio wave transmitting member and received directly by the radio wave receiving member. The peak 'b' in the figure shows a waveform of a radio wave that was reflected from the wood located in the first prescribed area A and then received. The peak 'c' in the figure shows a waveform of a radio wave that was reflected from a radio wave reflector located in the first prescribed area A and then received. As is clear from the figures, the reflected waveform 'b' that shows the radio waves reflected from the work W has a low peak voltage. Conversely, the reflected waveform 'c', which shows the radio waves that have penetrated the work W and are reflected from the reflector, has a high peak voltage. Consequently, it is possible to determine whether an object other than the work W exists in the vicinity of the circular saw 3 on the basis of the peak voltages of the output waveforms output by the first radar 46.

Furthermore, the time elapsed until the reflected waves are observed (for example, the period t0~t1 shown in FIG. 8(D)) is determined by the distance between the first radar 46 and the reflector. As long as the reflector exists in the first prescribed area A, the reflected waves 'c' may be detected during the period of t0~t2. The first radar 46 continues to monitor the reflected waves during the period of t0~t2.

Figure 9:
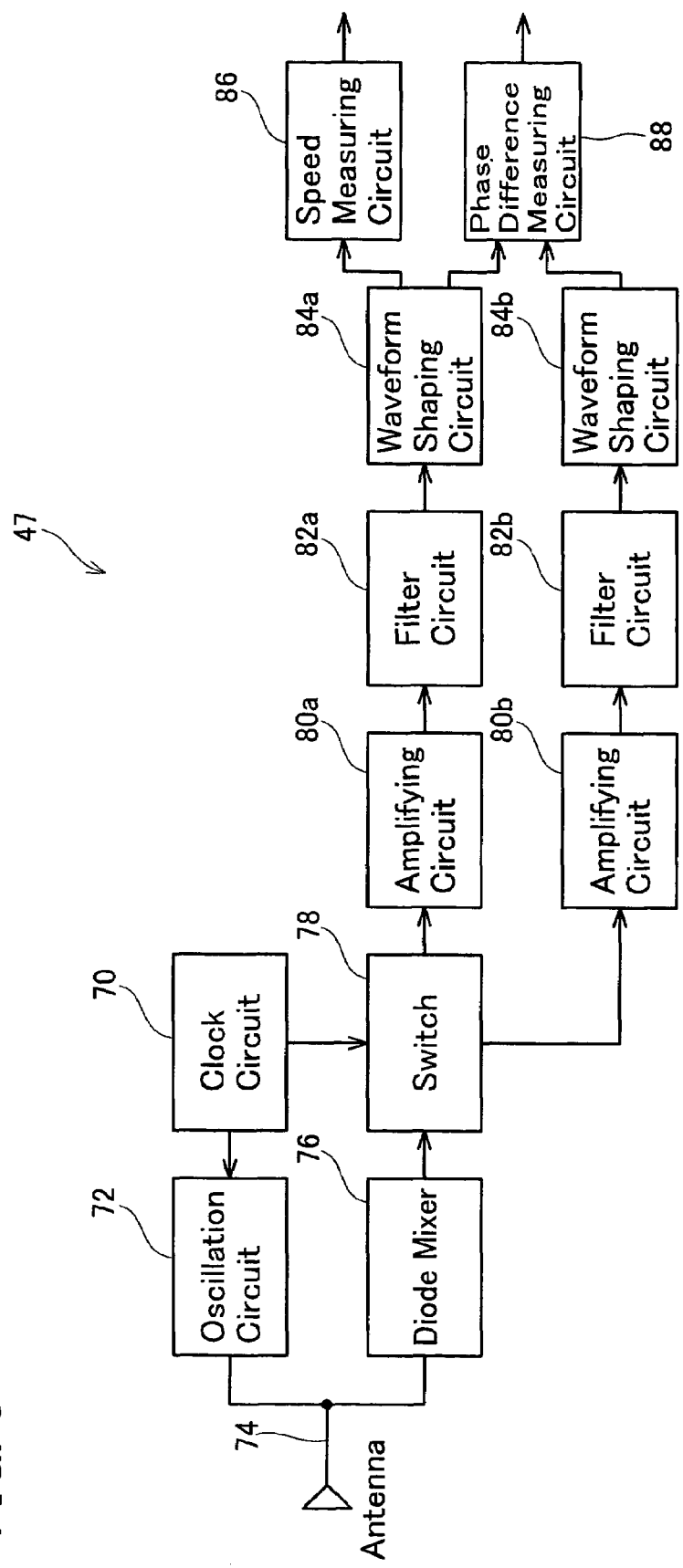
FIG. 9 shows a block diagram showing a configuration of a second radar.
Figure 10:
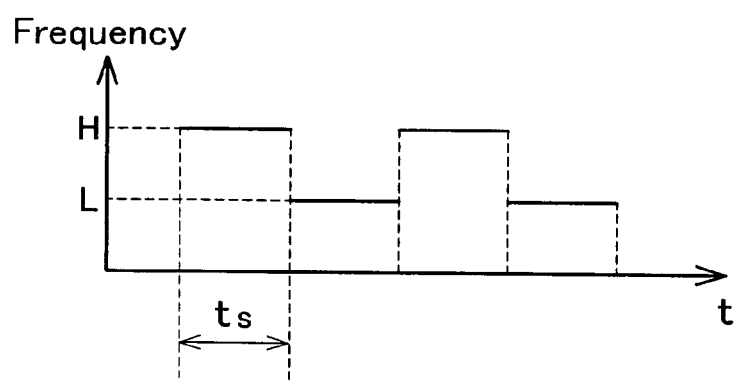
FIG. 10 shows periodic changes in the frequency of radio waves transmitted from the second radar.

The second radar 47 will be described. FIG. 9 is a block diagram showing the configuration of the second radar 47. As shown in FIG. 9, the second radar 47 is provided with a transmitting and receiving antenna 74 for transmitting and receiving radio waves. An oscillation circuit 72 is connected with the transmitting and receiving antenna 74 (specifically, with a radio wave transmitting member of the transmitting and receiving antenna 74), and a clock circuit 70 is connected with the oscillation circuit 72. The clock circuit 70 periodically transfers the frequency of the voltage that is output from the oscillation circuit 72 to two-phase, and simultaneously switches the state of a switch 78. As a result, as shown in FIG. 10, the frequency of the voltage that is output from the oscillation circuit 72 is periodically (1 period=2×ts) switched between a high frequency H and a low frequency L. Further, when the frequency of the voltage that is output from the oscillation circuit 72 (in other words, the radio waves transmitted from the transmitting and receiving antenna 74) is switched, a circuit (80a~84a and 80b~84b) is simultaneously switched. This circuit processes a received signal that is output from a radio wave receiving member of the transmitting and receiving antenna 74.

Further, as is clear from FIG. 10, the second radar 47 differs from the first radar 46 in that it continuously transmits radio waves at one of the two frequencies.

Moreover, a diode mixer 76 is connected with the transmitting and receiving antenna 74 (specifically, with the radio wave receiving member of the transmitting and receiving antenna 74). The receiving antenna 74 receives (1) the radio waves that have been transmitted from the transmitting antenna 74 and that have not been reflected and (2) the radio waves that have been reflected from the reflector. The diode mixer 76 multiplies the radio waves of (1) and (2) and outputs detected wave voltages (a so-called waveform detecting circuit).

The output voltage from the diode mixer 76 varies on the basis of whether or not the reflector is moving towards the second radar 47 (in other words, in the direction in which work is sent). If the reflector is not moving, the radio waves reflected by the reflector have the same frequency as the radio waves transmitted from the transmitting and receiving antenna 74. By contrast, due to the Doppler effect, the radio waves reflected by the reflector have a frequency different from that of the radio waves transmitted by the transmitting and receiving antenna 74 if the reflector is moving. As a result, if the reflector is moving, radio waves having two slightly differing frequencies mutually interfere, thus generating beats in the output voltage of the diode mixer 76. The second radar 47 is a radar that measures the speed of movement of the reflector utilizing the frequency of these beats.

The output voltage of the diode mixer 76 also differs from the frequency of the radio waves output from the transmitting and receiving antenna 74. The second radar 47 is a radar that transmits radio waves having mutually differing frequencies, detects the beats generated by these differing frequencies of radio wave, and measures the position of the reflector (the distance from the second radar 47) from the phase difference of the beats.

Two circuit groups are connected with the diode mixer 76 via the switch 78. The first circuit group consists of an amplifying circuit 80a, a filter circuit 82a and a waveform shaping circuit 84a. The second circuit group consists of an amplifying circuit 80b, a filter circuit 82b, and a waveform shaping circuit 84b. The first circuit group is connected with the diode mixer 76 when the transmitting and receiving antenna 74 is transmitting radio waves at the first frequency. The second circuit group is connected with the diode mixer 76 when the transmitting and receiving antenna 74 is transmitting radio waves at the second frequency. The structure and effects of the circuits is identical with those of the circuits used in the first radar 46.

The second radar 47 is provided with a speed measuring circuit 86 and a phase difference measuring circuit 88. The speed measuring circuit 86 is connected with the waveform shaping circuit 84a, and the output voltage of the waveform shaping circuit 84a is input to the speed measuring circuit 86. The speed measuring circuit 86 measures the frequency of the beats generated in the output voltage of the waveform shaping circuit 84a (in other words, it measures the speed of the reflector). The phase difference measuring circuit 88 is connected with both the waveform shaping circuits 84a and 84b, and the output voltage of both the waveform shaping circuits 84a and 84b are input to the phase difference measuring circuit 88. The phase difference measuring circuit 88 is a circuit that measures the phase difference between the output voltages of the waveform shaping circuits 84a and 84b (in other words, it measures the position of the reflector). The measurement results of the speed measuring circuit 86 and of the phase difference measuring circuit 88 are both input to the controlling member 15.

It is preferred that, like the first radar 46, the radio waves utilized by the second radar 47 are 1 to 30 GHz. In the present embodiment, 24.2 GHz microwaves are used. Since it is preferred that the second radar 47 monitors only the surroundings of the circular saw 3, radio waves are used that have a higher frequency than that of the first radar 46 and the directivity of the radio waves is thus increased. Further, the wavelength grows shorter as the frequency of radio waves is made higher. This allows the location and speed of the reflector to be measured accurately.

Moreover, the antenna shape and location of the second radar 47 are determined so that a desired directivity (that is, a directivity adequate to monitor the surroundings of the circular saw 3) can be obtained when radio waves at the above frequencies are transmitted.

The present applicant has created power tools wherein the surroundings thereof are monitored by radar, and has applied for patents thereof (Japanese Patent Application 2002-328837, Japanese Patent Application 2003-81399). A technique is set forth for monitoring the surroundings of a power tool by means of radar in Japanese Patent Application 2002-328837. A technique utilizing a microstrip antenna or a patch antenna in a power tool is set forth in Japanese Patent Application 2003-81399. These techniques can be effectively utilized in the table saw 1.

Figure 11:
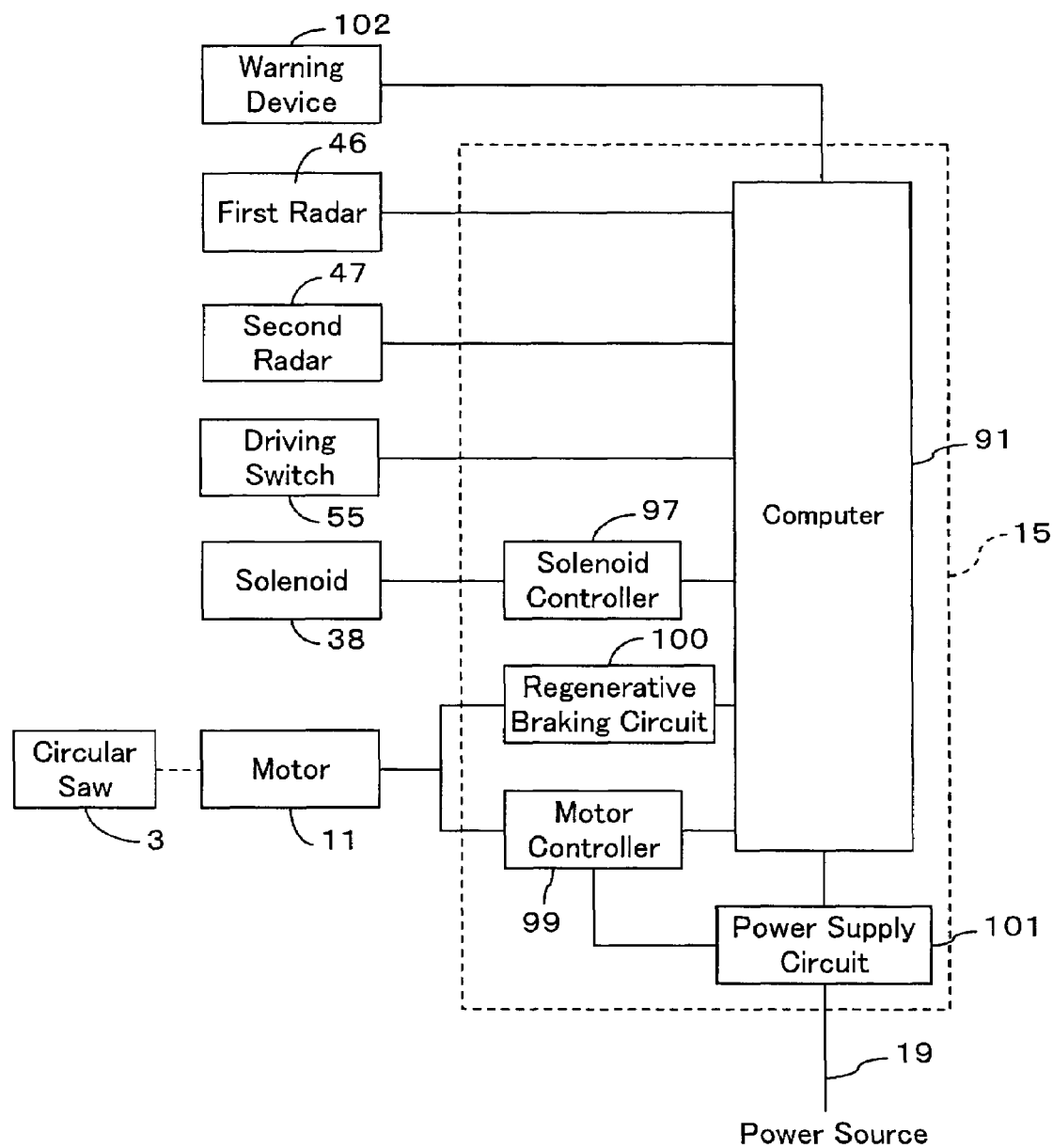
FIG. 11 shows an electrical configuration of the table saw.

The electrical configuration of the table saw 1 is shown in FIG. 11. The controlling member 15 is provided with a microcomputer 91. The microcomputer 91 is provided with a CPU, ROM, RAM and I/O. A program for controlling the table saw 1 is stored in the ROM of the microcomputer 91. Further, the controlling member 15 is provided with a solenoid controller 97, a motor controller 99, and a regenerative braking circuit 100. The solenoid controller 97, the motor controller 99, and the regenerative braking circuit 100 are connected with the microcomputer 91.

The solenoid 38 is connected with the solenoid controller 97. The solenoid controller 97 operates the solenoid 38. The microcomputer 91 gives operating commands for the solenoid 38.

The motor 11 is connected with the motor controller 99. The motor controller 99 controls the driving operation of the motor 11. The microcomputer 91 gives driving commands for the motor 11.

The motor 11 is connected with the regenerative braking circuit 100. The regenerative braking circuit 100 closes the circuit to the motor 11 and causes the motor 11 to generate power. By causing the motor 11 to generate power, the regenerative braking circuit 100 reduces the inertial energy of the motor 11 and thus brakes the motor 11. The microcomputer 91 gives operating commands for the regenerative braking circuit 100.

A warning device 102 and a driving switch 55 are connected with the microcomputer 91. The warning device 102 is capable of sounding a first warning and a second warning. The first warning and the second warning generate mutually differing alarm sounds. By listening to these alarm sounds, the operator can determine whether the first warning or the second warning is being sounded. The warning device 102 sounds the first warning or the second warning on the basis of commands from the microcomputer 91.

The table saw 1 is provided with a power supply circuit 101. Power is supplied to each component via the power supply circuit 101.

The first radar 46 and the second radar 47 are connected with the microcomputer 91. The microcomputer 91 detects the received waveforms that are input from the first radar 46, detects the peak 'a' and the peak 'c' shown in FIG. 8, and calculates the period t1–t0 between these peaks. The distance between the circular saw 3 and the reflector is found from this calculated period. It is determined whether the reflector is in the first prescribed area from the distance that has thus been found.

The frequency of the beats measured by the speed measuring circuit 86, and the phase difference of the beats measured by the phase difference measuring circuit 88 are input from the second radar 47. The microcomputer 91 calculates the speed at which the reflector is approaching the circular saw 3 from the frequency of the beats that were input, and calculates the distance between the circular saw 3 and the reflector from the phase difference of the beats that were input.

Figure 12:
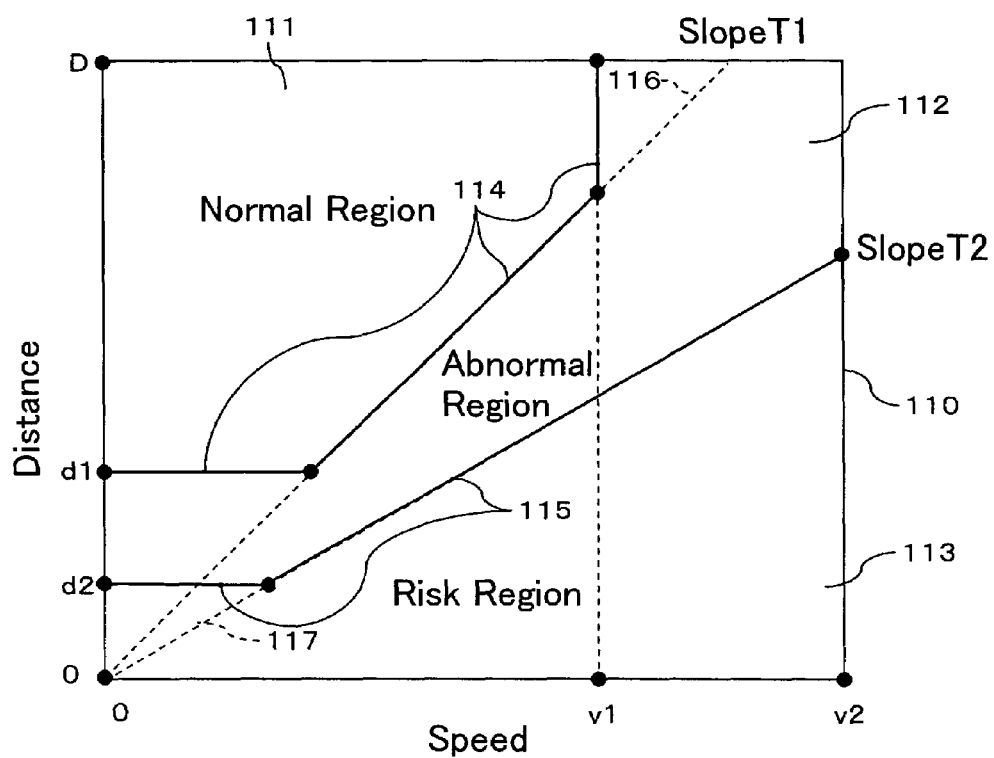
FIG. 12 shows a condition-determining map.

A condition-determining map 110, shown in FIG. 12, is stored in the ROM of the microcomputer 91. The condition-determining map 110 is a two-dimensional map wherein the distance to the circular saw 3 is shown on the vertical axis, and the speed of approach to the circular saw 3 is shown on the horizontal axis. The condition-determining map 110 is divided based on the ratios of risk as to whether an object other than work W will make contact with the circular saw 3. The ratios of risk are classified based on pairs of values relating to the distance to the circular saw 3 and the speed of approach to the circular saw 3. Specifically, the condition-determining map 110 has a normal region 111, an abnormal region 112, and a risk region 113. In FIG. 12, the boundary of each region is shown by a solid line. The broken lines do not indicate boundaries. The normal region 111 is a region showing pairs of values detected during normal processing operations. The abnormal region 112 and the risk region 113 are regions showing pairs of values that are not detected during normal processing operations. The risk region 113 has a greater proportion of abnormality than the abnormal region 112. These have a higher risk that an object other than work W will make contact with the circular saw 3.

The abnormal region 112 and the risk region 113 are determined on the basis of the time remaining before the detected object makes contact with the circular saw 3. This remaining time is found from the distance from the circular saw 3 and the speed of approach to the circular saw 3 that have been detected. In the condition-determining map 110, the abnormal region 112 is a region wherein the remaining time is shorter than T1. The risk region 113 is a region wherein the remaining time is shorter than T2. The period T2 is shorter than the period T1. In FIG. 12, the slope of the broken line 116 shows T1. The slope of the broken line 117 shows T2. The region below the broken line 116 is a region in which the remaining time is less than T1. This is the abnormal region 112. The region below the broken line 117 is a region in which the remaining time is less than T2. This is the risk region 113.

A region wherein a distance to the circular saw 3 is equal to or less than d1 is also set to be within the abnormal region 112 although it is within the region in which the remaining time is longer than T1. Further, a region in which a distance to the circular saw 3 is equal to or less than d2 is set so as to be within the risk region 113. The distance d2 is shorter than the distance d1. The distance d1 is a distance wherein an object other than work W must not, for safety reasons, approach the circular saw 3 during normal processing operations of the table saw 1. Consequently, an abnormal state is determined irrespective of the speed of the object when an object other than work W has approached the circular saw 3 within the distance d1. Moreover, a state of risk is determined irrespective of the speed of the object when an object other than work W has approached the circular saw 3 within the distance d2.

A region wherein the speed of approach to the circular saw 3 is equal to or greater than v1 is set to form the abnormal region 112 although the region, determined from the remaining time, should have been within the normal region 111. The speed of approach v1 is a speed at which it is estimated that an object other than work W will not approach the circular saw 3 during normal processing operations of the table saw 1.

As described above, a boundary 114 is formed between the normal region 111 and the abnormal region 112 in the condition-determining map 110. Further, a boundary 115 is formed between the abnormal region 112 and the risk region 113. The boundary 114 functions as a first criterion for determining the risk that an object other than work W will make contact with the circular saw 3. The boundary 115 functions as a second criterion for determining the risk that an object other than work W will make contact with the circular saw 3. In the first criterion and the second criterion—with the exception of an area that is extremely close to the circular saw 3—distance from the circular saw 3 is set to become greater as speed increases. Further, relative to the same speed, this distance is longer in the first criterion than in the second criterion.

In the condition-determining map 110, the greatest value on the vertical axis is the distance D, and the greatest value on the horizontal axis is the speed v2. The distance D is the distance that is furthest from the circular saw 3 of the regions monitored by the first radar 46 and the second radar 47. The speed v2 is the greatest speed at which it is estimated an object other than work W will approach the circular saw 3. The speed v2 is set using normal usage of the table saw 1 as a reference.

The microcomputer 91 determines the condition-determining map 110 using the pairs of values of the distance of the reflector from the circular saw 3 and the speed of approach to the circular saw 3 that were detected by the first radar 46 and the second radar 47. By this means, it is possible to determine whether there is a risk that the reflector that has been detected will make contact with the circular saw 3. Should this risk be present, the likelihood of this risk can be determined.

The sequence of operations of the table saw 1 will now be described using the flowchart of FIG. 13. The starting point of the flowchart 13 is the insertion of a power supply switch (not shown) of the table saw 1.

At step S1, the table saw 1 is in a waiting state until the operator turns the driving switch 55 ON. When the driving switch 55 has been turned ON, the process proceeds to step S3.

At step S3, the first radar 46 and the second radar 47 begin to operate. The microcomputer 91 controls the output voltages of the first radar 46 and the second radar 47 and begins to monitor for reflectors (objects other than work W).

At step S5, the microcomputer 91 determines whether a reflector is in the monitored areas (the first prescribed area A and the second prescribed area B). When the presence of a reflector (an object other than work W) is not detected in the monitored areas, the process proceeds to step S7.

At this juncture, the waveforms received from the first radar 46 immediately after the insertion of the driving switch 55 may be stored in the RAM of the microcomputer 91. These stored waveforms are preliminary period waveforms, and can be utilized for noise processing during subsequent processing of the received waveforms. By this means, the reflected waves of the circular saw 3, etc. can be eliminated from the received waveforms and an object other than work W can thereby be detected accurately.

By contrast, when an object other than work W is detected in the monitored areas, the process proceeds to step S31. At step S31, the warning device 102 sounds the second warning, and the operation of the table saw 1 is halted. An object other than work W is not expected to be present in the monitored area during the period in which normal operation of the table saw 1 is begun. Consequently, the operation of the table saw 1 is halted before the circular saw 3 has begun rotating. In the table saw 1, the circular saw 3 is prevented from beginning rotation during abnormal conditions.

Figure 13:
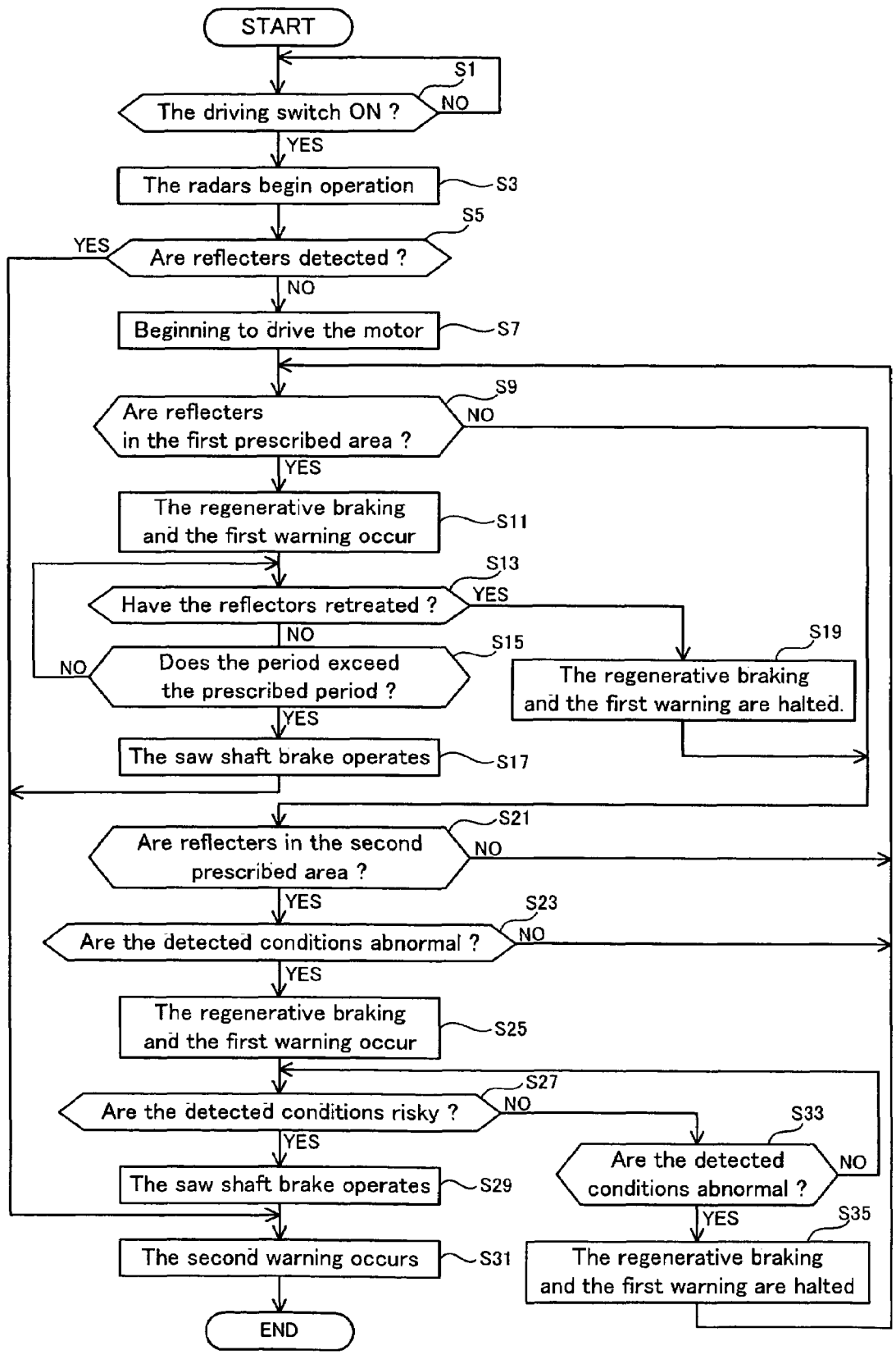
FIG. 13 is a flowchart showing the sequence of operation of the table saw.

At step S7 of FIG. 13, the microcomputer 91 commands the motor controller 99 to drive the motor 11. The rotational power of the motor 11 is transmitted to the saw shaft 27 via the one-way clutch 29. The circular saw 3 rotates together with the saw shaft 27.

At step S9, it is determined whether a reflector (an object other than work W) is in the first prescribed area A. The first prescribed area A is the area chiefly monitored by the first radar 46. If the presence of a reflector is detected (YES), the process proceeds to step S11. If the presence of a reflector is not detected (NO), the process proceeds to step S21. The first prescribed area A is an area in which, for safety reasons, an object other than work W must not be present during normal processing operations.

At step S11, the microcomputer 91 gives operating commands to the regenerative braking circuit 100 and the regenerative braking of the motor 11 occurs. When the motor 11 is braked, the rotation speed of the gear 21 decreases. When the rotation speed of the gear 21 decreases, the one-way clutch 29 causes the gear 21 and the saw shaft 27 to disengage. The circular saw 3 and the saw shaft 27 are thus both in a state of inertial rotation. Furthermore, the warning device 102 sounds the first warning. By this means, the operator can be informed that there is the risk of an object other than work W making contact with the circular saw 3.

At step S13 of FIG. 13, it is determined whether the reflector has retreated from the first prescribed area A. If the presence of the reflector in the first prescribed area A is not detected (YES), the process proceeds to step S19. If the continuing presence of the reflector in the first prescribed area A is detected (NO), the process proceeds to step S15.

At step S15, the period for which the reflector is remaining in the first prescribed area A is compared with a prescribed period. When the period for which the detected reflector has remained in the first prescribed area A exceeds the prescribed period (YES), the process proceeds to step S17. In the case where the period that the detected reflector has remained in the first prescribed area A does not exceed the determined period (NO), the process returns to step S13.

At step S17, the saw shaft brake 31 operates. The microcomputer 91 commands solenoid controller 97 to operate the solenoid 38. Operating the solenoid 38 activates the saw shaft brake 31. The saw shaft brake 31 forcibly brakes the saw shaft 27, thus halting the saw shaft 27. That is, the rotation of the circular saw 3 is halted. The rotation of the circular saw 3 is halted at the point at which it is detected that there is a risk that an object other than work W will make contact with the circular saw 3.

When the saw shaft brake 31 is operating, the rotation speed at the motor 11 side is reduced and the one-way clutch rotates idly. Consequently, the saw shaft brake 31 needs to brake only the components at the rotating tool side (the circular saw 3, the saw shaft 27, etc.). The components at the rotating tool side have a small moment of inertia, and consequently the components at the rotating tool side can be braked rapidly. There is the possibility that the rotation speed at the motor 11 side will catch up while the components at the rotating tool side are being braked rapidly. In that case, the motor is also rapidly braked by the saw shaft brake 31. At this juncture, the motor 11 has already slowed and the inertial energy thereof has decreased, so that the rapid braking of the motor 11 does not create any problem.

The process proceeds from step S17 to step S31. At step S31, the warning device 102 sounds the second warning, thus informing the operator that the saw shaft brake 31 is operating. The operation of the table saw 1 halts.

By contrast, when step S13 is YES, the regenerative braking of the motor 11 is halted at step S19, and the first warning is halted. The process then proceeds to step S21. The above sequence is a state wherein the object other than work W temporarily approached the tool and then retreated. For example, the operator may have inadvertently allowed a finger to approach the circular saw 3 and became aware of the risk upon hearing the first warning. At this juncture, the regenerative braking of the motor 11 is halted and it is possible to continue operations using the table saw 1.

At step S21 of FIG. 13, it is determined whether the reflector (the object other than work W) is present in the second prescribed area B. The second prescribed area B is the area chiefly monitored by the second radar 47. When the presence of a reflector is detected (YES), the process proceeds to step S23. When the presence of a reflector is not detected (NO), the process returns to step S9.

At step S23, the pairs of values relating to the distance to the circular saw 3 of the detected reflector and the speed of approach to the circular saw 3 of the detected reflector are determined using the condition-determining map 110. When the pairs of values that have been detected are in the abnormal region 112 (YES), the process proceeds to step S25. When the pairs of values that have been detected are not in the abnormal region 112 (NO), the process returns to step S9.

At step S25, the regenerative braking of the motor 11 is caused and the warning device 102 sounds the first warning. This is identical with step S11.

At step S27, as with step S23, the degree of risk that the reflector will make contact with the circular saw 3 is determined from the pairs of values relating to the detected distance to the circular saw 3 of the reflector and the detected speed of approach to the circular saw 3 of the reflector. The microcomputer 91 compares the detected pairs of values with the condition-determining map 110. When the pairs of values that have been detected are in the risk region 113 of the condition-determining map 110 (YES), the process proceeds to step S29. When the pairs of values that have been detected are not in the risk region 113 of the condition-determining map 110 (NO), to step S33.

At step S29, the saw shaft brake 31 operates. This is identical with step S17. That is, the rotation of the circular saw 3 is halted. The rotation of the circular saw 3 is halted at the point at which it is detected that there is a high risk of an object other than work W making contact with the circular saw 3. Following this, at step S31, the warning device 102 sounds the second warning. The operation of the table saw 1 is halted.

When the determination at step S27 is NO and the process proceeds from step S27 to step S33, it is determined at step S33 whether the pairs of values belong in the normal region 111 of the condition-determining map 110. When the pairs of values are in the normal region 111 (YES), the process proceeds to step S35. At step S35, the regenerative braking of the motor 11 is halted, and the first warning is halted. The process then returns to step S9. The above sequence is a state wherein an object other than work W temporarily approached the tool and then retreated. For example, the operator inadvertently allowed a finger to approach the circular saw 3 and became aware of the risk upon hearing the first warning. At this juncture, the regenerative braking of the motor 11 is halted and it is possible to continue operations using the table saw 1.

By contrast, when the determination at step S33 is NO, the process returns to step S15. This case shows that the abnormal state is continuing, the regenerative braking of the motor 11 is continued, and the reflector continues to be monitored.

As described above, the table saw 1 is monitored by two radars: the first radar 46 and the second radar 47. The first radar 46 mainly monitors the first prescribed area A that is in the vicinity of the processing location of the circular saw 3. The first prescribed area A is an area in which an object other than work W must not be present. When an object other than work W enters the first prescribed area A this is promptly detected by the first radar 46, and regenerative braking of the motor 11 is performed. Further, the first warning is sounded. Moreover, when the object other than work W has remained in the first prescribed area A for a determined period, the saw shaft brake 31 operates and the circular saw 3 is halted. The regenerative braking is a braking in a comparatively gentle manner, and consequently a low load is exerted on the table saw 1. The saw shaft brake 31 performs rapid braking by exerting a strong braking force. However, speed has already been reduced by the regenerative braking of the motor 11. Consequently no particularly heavy load is exerted on the saw shaft brake 31, and no particularly strong counter force is exerted on the table saw 1 or on the support of the table saw 1.

The second radar 47 mainly monitors the second prescribed area B. The second prescribed area B is an area in which an object other than work W can be present during normal operation. Consequently, it is not possible to determine the degree of risk using merely the presence or absence of a reflector. The second radar 47 detects both the distance of the reflector to the circular saw 3 and the speed of approach of the reflector to the circular saw 3. By this means, in the table saw 1, it is possible to detect the degree of risk as to whether the detected reflector will make contact with the circular saw 3, and to brake the circular saw 3 based on this degree of risk.

Figure 14:
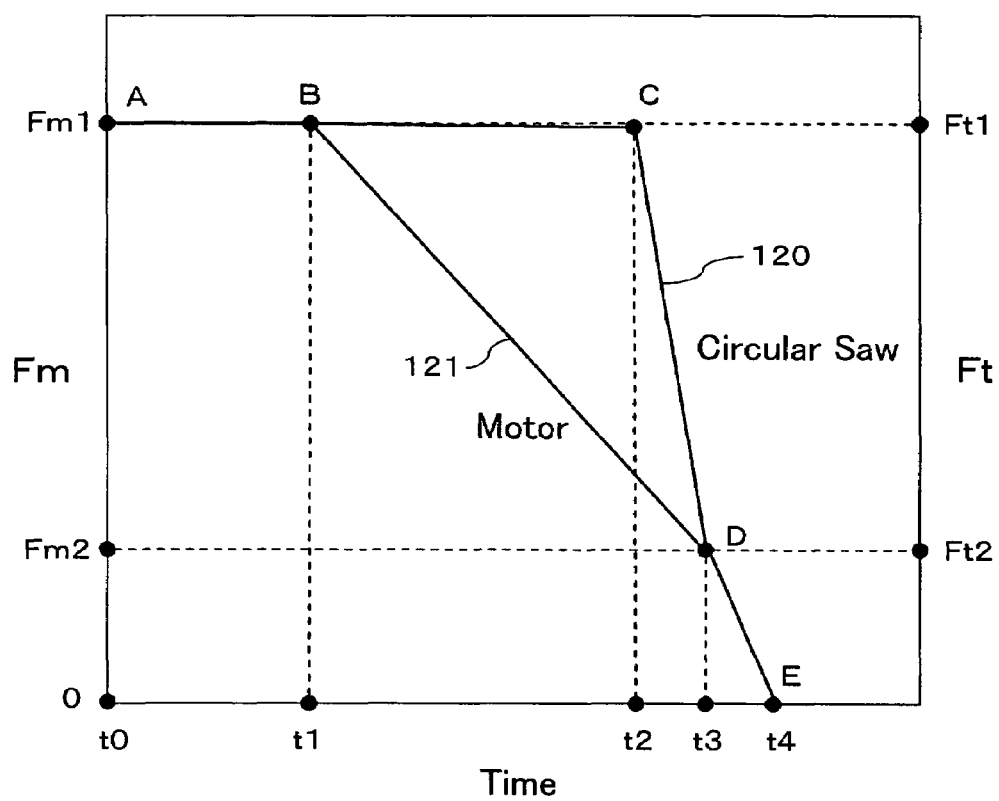
FIG. 14 shows changes over time in the rotation speed of a circular saw and an electric motor in the first embodiment.

FIG. 14 shows changes over time in the rotation speed of the circular saw 3 and the motor 11 (number of rotations/unit of time) while the circular saw 3 is being braked on the basis of the results detected by the second radar 47. Further, in FIG. 14, the rotation speed Ft of the circular saw 3 is on the right vertical axis, and the rotation speed Fm of the motor 11 is on the left vertical axis. The scale of the left and right vertical axes is magnified with respect to the rate of speed of the motor 11 and the circular saw 3. This allows the relationship between the rotation speed Ft of the circular saw 3 and the rotation speed Fm of the motor 11 to be compared easily. In FIG. 14, the overlapping of the rotation speed of the circular saw 3 and the motor 11 indicates that the circular saw 3 and the motor 11 are rotating in unison.

FIG. 14 shows a case in which the table saw 1, which is being driven at rated output, has regenerative braking applied to the motor 11 at time t1 (step S25), and in which the saw shaft brake 31 is operated at time t2 (step S29). During rated output, the rotation speed of the circular saw 3 is Ft1, and the rotation speed of the motor 11 is Fm1. The changes over time in the rotation speed of the circular saw 3 are shown by the solid line 120 that joins the points A, B, C, D, and E. The changes over time in the rotation speed of the motor 11 are shown by the solid line 121 that joins the points A, B, D, and E.

At time t1, the regenerative braking of the motor 11 begins, and the rotation speed of the motor 11 decreases (line segment BD). This emergency braking is gentle, and no particularly strong counter force is exerted on the motor 11 or on the support thereof. As the rotation speed of the motor 11 is reduced, the one-way clutch 29 causes the circular saw 3 and the motor 11 to be in a disengaged state. The circular saw 3 continues to rotate at approximately the same speed due to inertia.

At time t2, the saw shaft brake 31 operates, whereupon the rotation speed of the circular saw 3 falls rapidly. During the period from time t2 to time t3 (line segment CD), the saw shaft brake 31 brakes only the components at the rotating tool side (the circular saw 3, the saw shaft 27, etc.). These have a small moment of inertia. As a result, the saw shaft brake 31 can rapidly reduce the rotation speed of the circular saw 3. Further, the load exerted on the saw shaft brake 31 at this juncture is also reduced.

At time t3, the rotation speed of the circular saw 3 (Ft2), and the rotation speed of the motor 11 (Fm2) have the relationship: Ft2=R·Fm2 (R: the rate of speed reduction), and the one-way clutch 29 causes the circular saw 3 and the motor 11 to be in an engaged state. After time t3, while the circular saw 3 and the motor 11 are caused to be in an engaged state by the one-way clutch 29, the regenerative braking of the motor 11 and the saw shaft brake 31 both operate. The speed of the motor 11 has already been sufficiently reduced at time t3, and consequently the load on the saw shaft brake 31 is reduced. At time t4 (line segment DE), the circular saw 3 is completely halted.

The period required for braking, from beginning braking to the complete halt of the circular saw 3 is t4−t1. In other words, the remaining time (the time before a detected object other than work W will make contact with the circular saw 3), is longer than the period required for braking. Consequently, by beginning braking, the circular saw 3 can be halted before the object other than work W makes contact with the circular saw 3.

The greatest load is exerted on the saw shaft brake 31 at the times t2 and t3. In other words, greatest load is exerted at the time t2 when braking of the circular saw 3 that is rotating due to inertia at approximately the rated rotation speed Ft1 begins, and at the time t3 when the one-way clutch 29 causes the circular saw 3 and the motor 11 to be connected again. The saw shaft brake 31 can thus be configured so as to be able to withstand the load of these two times t2 and t3. The saw shaft brake 31 can be utilized efficiently by designing so that an identical load is exerted on the saw shaft brake 31 at these two times t2 and t3.

The load exerted on the saw shaft brake 31 at time t3 is determined, more or less, by the rotation speed of the motor 11 at that time. The rotation speed of the motor 11 at time t3 varies in accordance with the time at which regenerative braking of the motor 11 begins (time t1). That is, the braking capacity of the regenerative braking circuit 100 and the capacity of the saw shaft brake 31 have a close connection with the time at which regenerative braking of the motor 11 begins and the time at which the saw shaft brake 31 is operated. As described above, it is possible to use the condition-determining map 110 to determine the conditions under which the regenerative braking of the motor 11 is begun (when the remaining time is T1), and the conditions under which the saw shaft brake 31 is operated (when the remaining time is T2). In other words, the descriptions in the condition-determining map 110 allow the capacity of the regenerative braking circuit 100 and of the saw shaft brake 31 to be effectively utilized. This improves the likelihood that the circular saw 3 will reliably halt operation before the object other than work W makes contact therewith.

In the table saw 1 of the present embodiment, the second prescribed area is monitored by the second radar 47. The radio waves utilized by the second radar 47 penetrate the work W and are reflected from the object other than work W. That is, only the object other than work W is an effective reflector. Using the radar, it is possible to recognize the object other than work W and to detect the likelihood of this object making contact with the rotating circular saw 3. By this means, the regenerative braking of the motor 11 and the saw shaft brake 31 are operated based on the degree of likelihood of the object making contact with the rotating circular saw 3. By causing the regenerative braking of the motor 11 and by operating the saw shaft brake 31, the period required for braking the circular saw 3 is ensured. That is, the rotation of the circular saw 3 can be halted before the object other than the work W makes contact therewith. Further, the regenerative braking circuit 100 and the saw shaft brake 31 have a compact and simple configuration, and can easily return to their original state after an emergency stop.

In the table saw 1, contact between the rotating circular saw 3 and an object other than work W can be, as far as possible, prevented. The table saw 1 is provided with the safety cover 7. Using this safety cover 7 allows the safety of the user etc. to be further ensured.

In the table saw 1, two radars are utilized: the first radar 46 and second radar 47. Each of these radars independently performs monitoring. Consequently, should one of the radars fail, the remaining radar can continue monitoring.

(Embodiment 2)

A table saw of Embodiment 2 that utilizes the technique of the present teachings is substantially identical with Embodiment 1, with only portions thereof being modified. Consequently, the description will focus on the parts differing from the table saw 1 of Embodiment 1.

The points wherein the table saw of Embodiment 2 differs from the table saw 1 of Embodiment 1 will first be listed.

(Difference 1) The one-way clutch 29 is not present, and the gear 21 and the saw shaft 27 are integral and are fixed co-axially.

Figure 15:
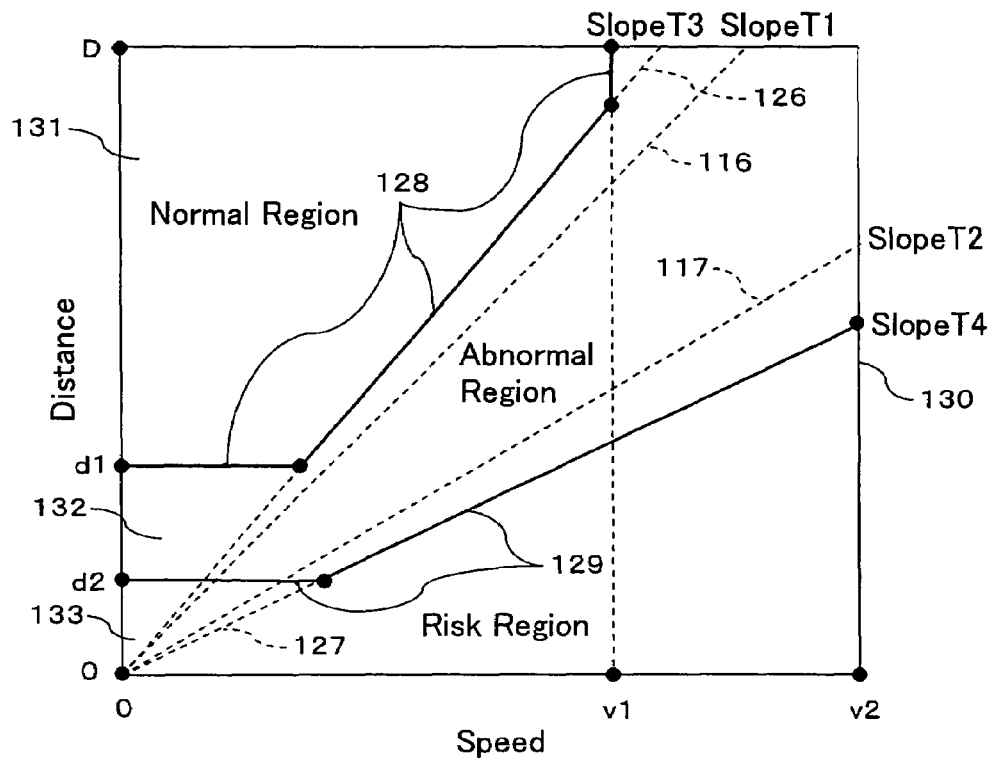
FIG. 15 shows a second condition-determining map.

(Difference 2) The condition-determining map 110 stored in the microcomputer 91 is modified to form a second condition-determining map 130 shown in FIG. 15.

(Difference 1) There is no clutch between the motor and the circular saw in Embodiment 2. As a result, when a braking force is operated on the motor 11, the rotation speed of the circular saw 3 falls integrally therewith.

(Difference 2 The second condition-determining map 130 used in Embodiment 2 will now be described. The second condition-determining map 130 shown in FIG. 15 has been modified, relative to the condition-determining map 110 of Embodiment 1, to have a boundary 128 (a first criterion) between a normal region 131 and an abnormal region 132. Specifically, a portion of the boundary 128 (the first criterion) is further upwards, relative to the figure, than its equivalent in the condition-determining map 110 of Embodiment 1 (the broken line 116 shown in FIG. 15), and this portion is located on a broken line 126. The slope of the broken line 126 shows T3. As a result, regenerative braking of the motor 11 will be performed when the remaining time (the time until the detected object other than work makes contact with the circular saw 3) is equal to or below T3. The period T3 is longer than the remaining time T1 of Embodiment 1. That is, when an object other than work is approaching the circular saw 3, regenerative braking of the motor 11 is performed at an earlier time with the table saw of Embodiment 2 than with the table saw 1 of Embodiment 1.

Further, a boundary 129 (a second criterion) between the abnormal region 132 and a risk region 133 has also been modified. Specifically, a portion of the boundary 129 (the second criterion) is further downwards, relative to the figure, than its equivalent in the condition-determining map 110 of Embodiment 1 (the broken line 117 shown in FIG. 15), and this portion is located on a broken line 127. The slope of the broken line 127 shows T4. As a result, the saw shaft brake 31 is operated when the remaining time (the time until the object other than work that has been detected makes contact with the circular saw 3) is equal to or below T4. The time T4 is shorter than the remaining time T2 of Embodiment 1. That is, when an object other than work is approaching the circular saw 3, the shaft brake 31 will be operated at a later time with the table saw of Embodiment 2 than with the table saw 1 of Embodiment 1.

Figure 16:
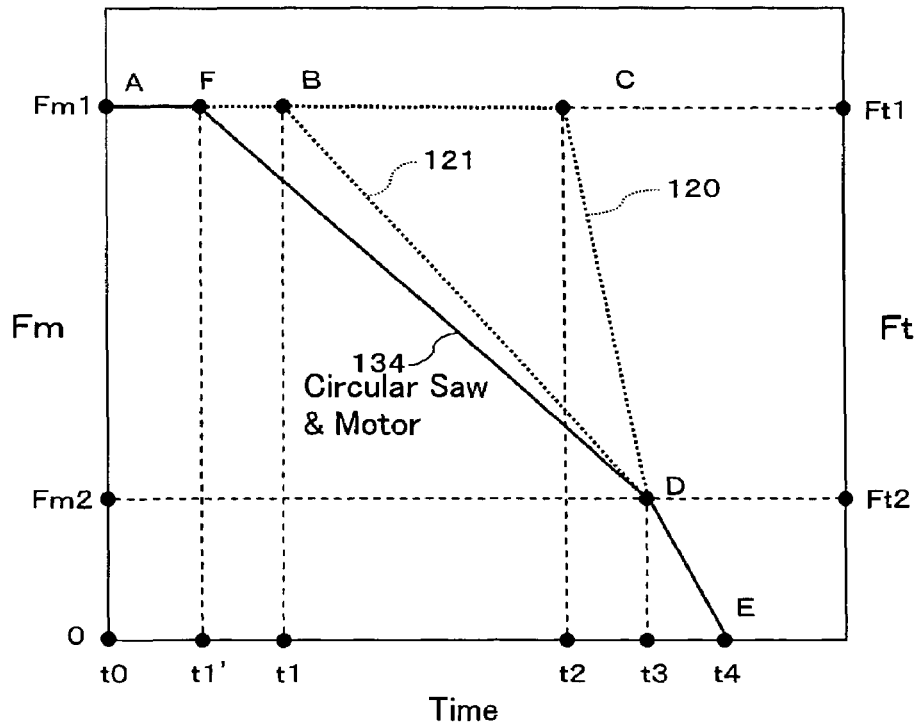
FIG. 16 shows changes over time in the rotation speed of the circular saw and the electric motor in the second embodiment.

The operation of the table saw of Embodiment 2, as with that of the table saw 1 of Embodiment 1, is shown in the flowchart of FIG. 13. FIG. 16, like FIG. 14, shows changes over time in the rotation speed of the circular saw 3 and the motor 11 (number of rotations/unit of time) when the circular saw 3 is braked. These changes over time are required for halting the rotation of the circular saw 3 before the time t4. The time t4 is equal to the time t4 shown in FIG. 14 which is earlier than a time when the object makes contact with the circular saw 3.

In the table saw of Embodiment 2, regenerative braking of the motor 111 occurs at time t1', the saw shaft brake 31 is operated at time t3, and the rotation of the circular saw 3 is halted by time t4. In FIG. 16, the changes over time in the rotation speed of the circular saw 3 are shown by the solid line 134 that joins the points A, F, D, and E. Since the circular saw 3 and the motor 11 usually rotate in an integral manner, the changes over time in the rotation speed of the motor 11 are also shown by the solid line 134.

At time t1', the regenerative braking of the motor 111 begins, and the rotation speed of the motor 11 begins to fall. That is, the rotation speed of the circular saw 3 that is rotating therewith also falls.

At time t3 the saw shaft brake 31 operates. At this juncture, the rotation speed of the circular saw 3 is Ft2 and the rotation speed of the motor 11 is Fm2. That is, the same conditions as with the table saw 1 of Embodiment 1 are obtained at time t3. As a result, the circular saw 3 is completely halted at time t4. At this juncture, the load exerted on the saw shaft brake 31 does not exceed that of Embodiment 1, and there is no damage to the saw shaft brake 31, etc.

As described above, it is possible in the table saw of Embodiment 2 to stop the circular saw 3 before the time at which the object other than work makes contact with the rotating circular saw 3. That is, contact between the circular saw 3 under rotation and an object other than work W can be, as far as possible, prevented. Since the table saw of Embodiment 2 does not have the one-way clutch, the configuration thereof is simpler.

(Embodiment 3)

A table saw of Embodiment 3 for practicing the present teachings is a variant of the table saw 1 of Embodiment 1. Consequently, the description will focus on the parts differing from the table saw 1 of Embodiment 1. The points wherein the table saw of Embodiment 3 differs from the table saw 1 of Embodiment 1 will first be listed.

(Difference 1) Instead of the one-way clutch 29, as is shown in FIG. 3, a clutch 179 is provided that can switch the gear 21 and the saw shaft 27 between an engaged state and a disengaged state. The microcomputer 91 controls the switching of the clutch between engagement and disengagement.

Figure 17:
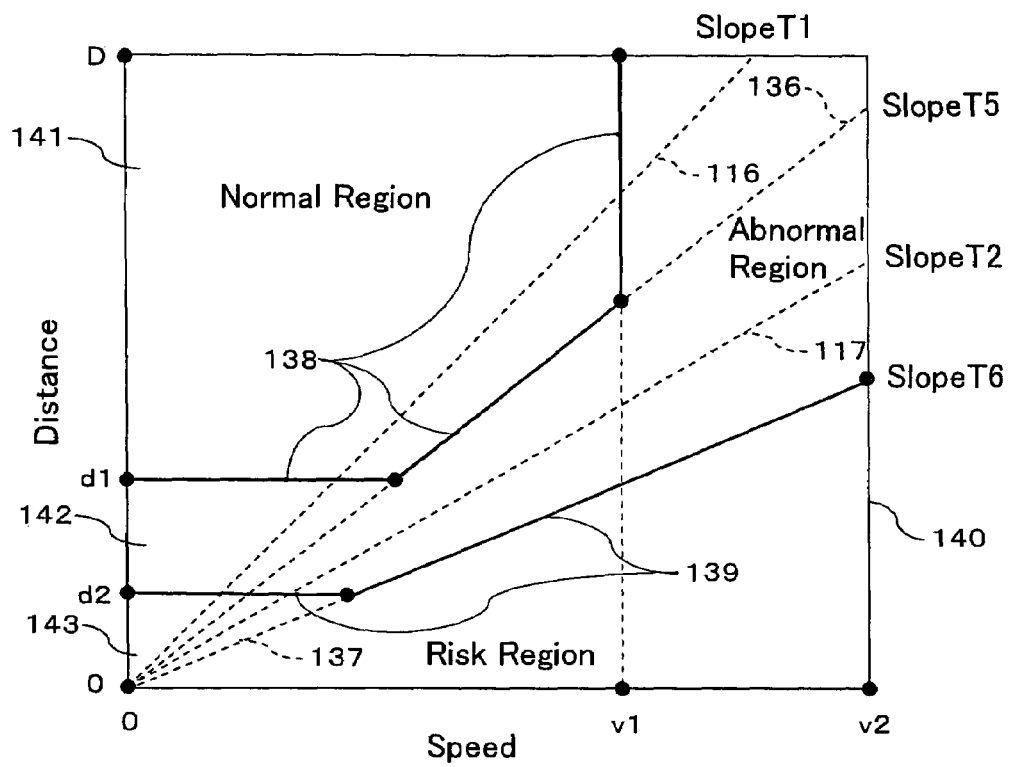
FIG. 17 shows a third condition-determining map.

(Difference 2) The condition-determining map 110 stored in the microcomputer 91 is modified to form a third condition-determining map 140 shown in FIG. 17.

(Difference 1) In the table saw of Embodiment 3, the transmission and non-transmission of power between the gear 21 and the saw shaft 27 is controlled by the microcomputer 91. This control is performed simultaneously with controlling the regenerative braking circuit 100. When the microcomputer 91 sends operating commands to the regenerative braking circuit 100, the clutch 179 is switched to the disengaged state and power is not transmitted between the gear 21 and the saw shaft 27. The operating commands from the microcomputer 91 to the regenerative braking circuit 100 can be used as commands for disengaging the clutch.

(Difference 2) The third condition-determining map 140 of the table saw of Embodiment 3 will now be described. The third condition-determining map 140 shown in FIG. 17 is modified, relative to the condition-determining map 110 of Embodiment 1, to have a boundary 138 (a first criterion) between a normal region 141 and an abnormal region 142. Specifically, a portion of the boundary 138 (the first criterion) is downward, relative to the figure, than its equivalent in the condition-determining map 110 of Embodiment 1 (the broken line 116 shown in FIG. 17), and this portion is located on a broken line 136. The slope of the broken line 136 shows T5. As a result, regenerative braking of the motor 11 is performed when the remaining time (the time until the object other than work that has been detected makes contact with the circular saw 3) is equal to or below T5. Simultaneously, the clutch 179 causes the gear 21 and the saw shaft 27 to be in a state wherein power is not transmitted. The remaining time T5 is shorter than the remaining time T1 of Embodiment 1. That is, when an object other than work is approaching the circular saw 3, regenerative braking of the motor 11 is performed at a later time with the table saw of Embodiment 3 than with the table saw 1 of Embodiment 1. Further, the clutch 179 simultaneously causes the gear 21 and the saw shaft 27 to be in a state wherein power is not transmitted.

Furthermore, a boundary 139 (a second criterion) between the abnormal region 142 and a risk region 143 has been modified. Specifically, a portion of the boundary 139 (the second criterion) is downward, relative to the figure, than its equivalent in the condition-determining map 110 of Embodiment 1 (the broken line 117 shown in FIG. 17), and this portion is located on a broken line 137. The slope of the broken line 137 shows T6. As a result, the saw shaft brake 31 is operated when the remaining time (the time until the object other than work that has been detected makes contact with the circular saw 3) is equal to or less than T6. The time T6 is shorter than the remaining time T2 of Embodiment 1. That is, when an object other than work is approaching the circular saw 3, the shaft brake 31 is operated at a later time with the table saw of Embodiment 3 than with the table saw 1 of Embodiment 1.

Figure 18:
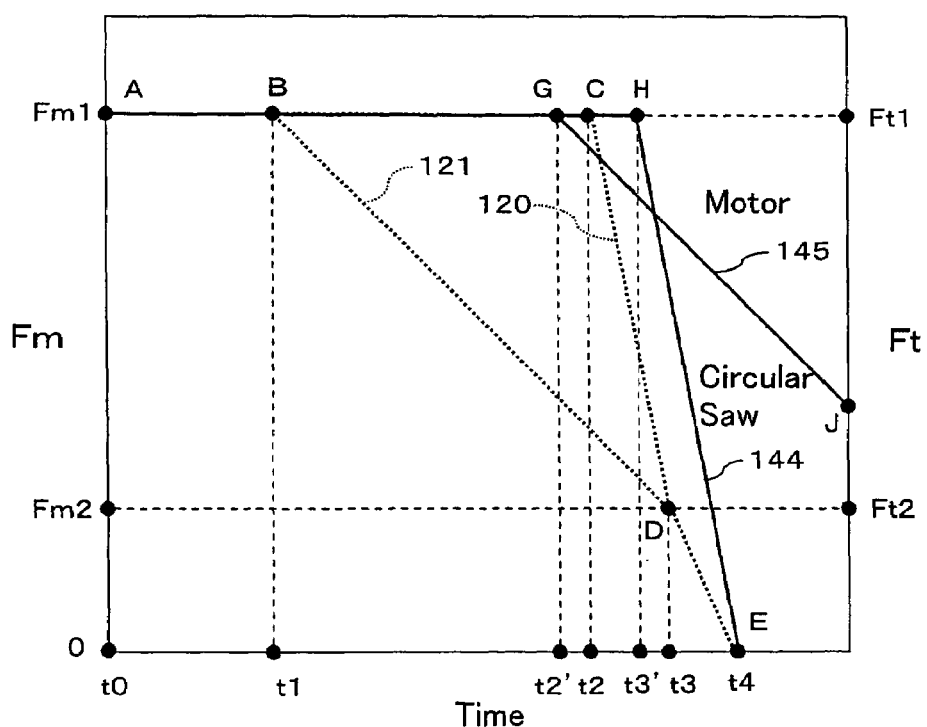
FIG. 18 shows changes over time in the rotation speed of the circular saw and the electric motor in the third embodiment.

The operation of the table saw of Embodiment 3, as with that of the table saw 1 of Embodiment 1, is shown in the flowchart of FIG. 13. FIG. 18, like FIG. 14, shows changes over time in the rotation speed of the circular saw 3 and the motor 11 (number of rotations/unit of time) when the circular saw 3 is braked. These changes over time are required for halting the rotation of the circular saw 3 before the time t4. The time t4 is equal to the time t4 shown in FIG. 14 which is earlier than a time when the object makes contact with the circular saw 3.

In the table saw of the present embodiment, regenerative braking of the motor 11 occurs at time t2', and the clutch simultaneously causes the gear 21 and the saw shaft 27 to be in a state wherein power is not transmitted. The saw shaft brake 31 is operated at time t3', and the rotation of the circular saw 3 is halted by time t4. In FIG. 18, the changes over time in the rotation speed of the circular saw 3 are shown by the solid line 144 that joins the points A, H, and E. The changes over time in the rotation speed of the motor 11 are shown by the solid line 145 that joins the points A, G, and J.

At time t2', the regenerative braking of the motor 11 begins, and the rotation speed of the motor 11 begins to fall. At this juncture, the clutch causes the gear 21 and the saw shaft 27 to be in a disengaged state. The circular saw 3 continues to rotate at approximately the same speed due to inertia. Alternatively, if the circular saw 3 is engaged in processing work W, the friction between the circular saw 3 and the work W brakes the circular saw 3, and the rotation speed of the circular saw 3 falls.

At time t3', the saw shaft brake 31 operates. The circular saw 3 is not in an engaged state with the motor 11, which has a large moment of inertia. Consequently, the rotation speed of the circular saw 3 falls rapidly. In the table saw of Embodiment 3, the speed of the circular saw 3 can be reduced without this having any connection with the speed of the motor 11. The circular saw 3 is braked rapidly, and is completely halted at time t4. That is, it is not necessary to halt the motor 11 with the table saw of Embodiment 3. The regenerative braking circuit 100 can also, for example, be omitted.

As described above, it is possible in the table saw of Embodiment 3 to halt the operation of the circular saw 3 before the time at which the object other than work makes contact with the operating circular saw 3. The circular saw 3 can be halted without halting the motor 11 in the table saw of Embodiment 3. As a result, the period required for braking, from the beginning of braking to the complete halt of the circular saw 3, can be reduced. Braking is set to begin at a later time, and this consequently prevents interruptions to the operations of the user that are caused by operating error.

The clutch 179 of the table saw of Embodiment 3 can be, for example, an electromagnetic powder clutch, a pneumatic clutch, etc. Furthermore, a centrifugal clutch can also be utilized as an additional brake for braking the motor 11. The centrifugal clutch transmits power to the saw shaft 27 when the motor 11 is rotating above a determined number of rotations, and does not transmit power to the saw shaft 27 when the motor 11 is rotating below a determined number of rotations. As a result, when the motor 11 that is rotating at a rated rotation is braked, the rotation speed of the motor 11 falls, and the gear 21 and the saw shaft 27 assume a disengaged state. That is, the driving operation of the motor 11 switches the gear 21 and the saw shaft 27 between an engaged state and a disengaged state when braking is controlled. The table saw of this aspect can be realized by replacing the one-way clutch 29 with the centrifugal clutch in the table saw 1 of Embodiment 1.

Figure 19:
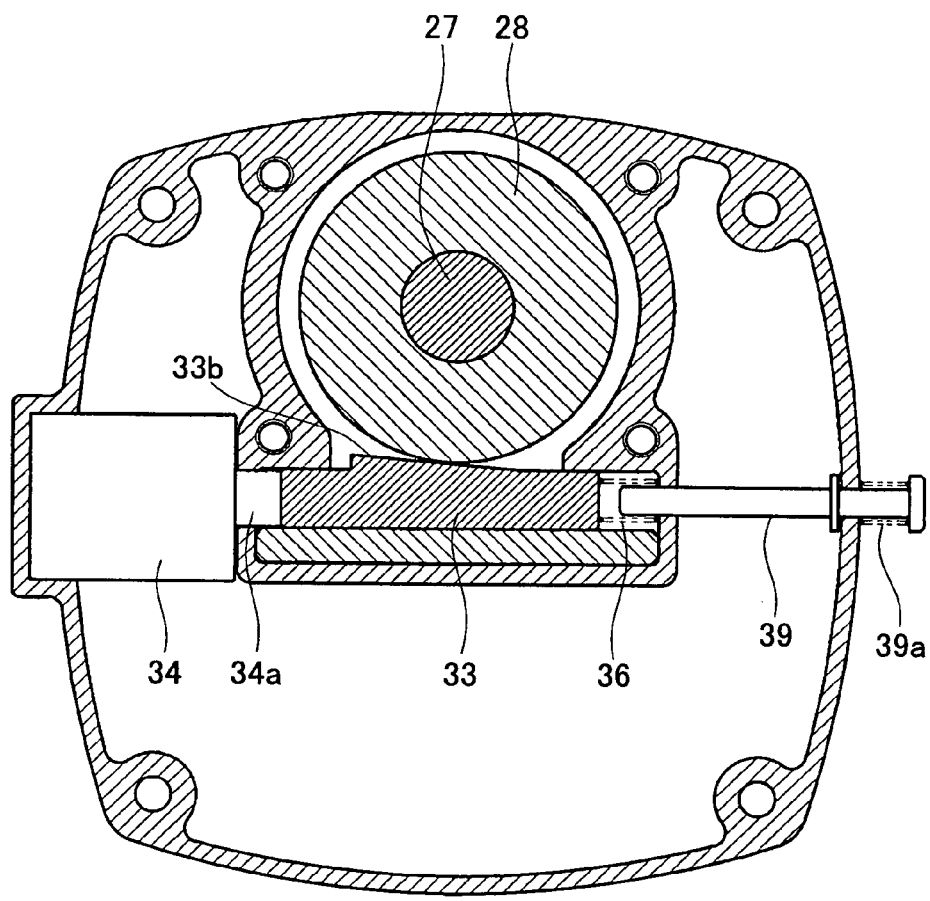
FIG. 19 shows a different example of a saw shaft brake.

The saw brake may be a brake as shown in FIG. 19. The saw brake shown in FIG. 19 has a configuration wherein a needle 34a is caused to protrude when power passes through a solenoid 34, and thereupon the sliding block 33 makes contact with the expanded diameter member 28.

There is no restriction on the type of radar that is utilized in the present embodiments. Moreover, there is no restriction on the type of antennas, the number of antennas provided, the location thereof, etc. This can be varied according to the aspect to be embodied.

The invention claimed is:

1. A power tool, comprising:
   a radar for transmitting radio waves towards an area in a vicinity of a rotating tool, and for receiving reflected radio waves reflected from a radio wave reflector existing within the area;
   a means for calculating, from the reflected radio waves received by the radar, a distance between the radio wave reflector and the rotating tool, and a speed of change of the distance;
   a first brake for applying gentle braking to the rotating tool when the calculated distance and speed fulfill a first criterion; and
   a second brake for applying rapid braking to the rotating tool when the calculated distance and speed fulfill a second criterion.

2. A power tool as set forth in claim 1, wherein distance in the first criterion and the second criterion increases as speed increases, and distance corresponding to a certain speed in the first criterion is longer than distance corresponding to the same speed in the second criterion.

3. A power tool as set forth in claim 2, further comprising:
a one-way clutch inserted between the rotating tool and a motor for causing the rotating tool to rotate, the one-way clutch causing the rotating tool and the motor to be in a disengaged state in a case where the rotation speed at the motor side is slower than the rotation speed at the rotating tool side,
wherein the first brake applies braking force to a component at the motor side of the one-way clutch, and the second brake applies braking force to a component at the rotating tool side of the one-way clutch.

4. A power tool as set forth in claim 3, wherein the first brake is a regenerative brake for braking an electric motor by causing the electric motor to generate power.

5. A power tool as set forth in claim 4, wherein the frequency of the radio waves utilized by the radar is within the range of 1 G to 30 GHz.

6. A power tool as set forth in claim 2, further comprising:
a clutch inserted between the rotating tool and a motor for causing the rotating tool to rotate, the clutch being capable of switching the rotating tool and the motor between an engaged state and a disengaged state,
wherein the first brake, by switching the clutch to the disengaged state, causes a state where a braking force is applied to the rotating tool by means of friction generated between the rotating tool and workpiece, and the second brake applies braking force to a component at the rotating tool side of the clutch.

7. A power tool as set forth in claim 6, wherein the frequency of the radio waves utilized by the radar is within the range of 1 G to 30 GHz.

8. A power tool, comprising:
a motor for causing a rotating tool to rotate;
a clutch inserted between the rotating tool and the motor, the clutch being capable of switching the rotating tool and the motor between an engaged state and a disengaged state;
a radar for transmitting radio waves towards an area in a vicinity of the rotating tool and for receiving reflected radio waves reflected from a radio wave reflector existing within the area;
a means for calculating, from the reflected radio waves received by the radar, a distance between the radio wave reflector and the rotating tool, and a speed of change of the distance;
a clutch switching means for switching the clutch to the disengaged state when the calculated distance and speed fulfill a first criterion; and
a brake for applying braking force to the rotating tool when the calculated distance and speed fulfill a second criterion.

* * * * *